(12) United States Patent
Lim et al.

(10) Patent No.: US 12,375,708 B2
(45) Date of Patent: *Jul. 29, 2025

(54) IMAGE ENCODING/DECODING METHOD AND APPARATUS, AND RECORDING MEDIUM STORING BITSTREAM

(71) Applicant: Electronics and Telecommunications Research Institute, Daejeon (KR)

(72) Inventors: Sung Chang Lim, Daejeon (KR); Jung Won Kang, Daejeon (KR); Ha Hyun Lee, Seoul (KR); Jin Ho Lee, Daejeon (KR); Hui Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/676,310

(22) Filed: May 28, 2024

(65) Prior Publication Data

US 2024/0333959 A1    Oct. 3, 2024

Related U.S. Application Data

(63) Continuation of application No. 17/277,186, filed as application No. PCT/KR2019/012008 on Sep. 17, 2019, now Pat. No. 12,108,071.

(30) Foreign Application Priority Data

Sep. 17, 2018 (KR) .......................... 10-2018-0111092

(51) Int. Cl.
*H04N 19/105* (2014.01)
*H04N 19/109* (2014.01)
*H04N 19/139* (2014.01)
*H04N 19/172* (2014.01)
*H04N 19/176* (2014.01)
(Continued)

(52) U.S. Cl.
CPC ......... *H04N 19/513* (2014.11); *H04N 19/105* (2014.11); *H04N 19/109* (2014.11); *H04N 19/139* (2014.11); *H04N 19/172* (2014.11); *H04N 19/176* (2014.11);
(Continued)

(58) Field of Classification Search
None
See application file for complete search history.

(56) References Cited

U.S. PATENT DOCUMENTS

2013/0294522 A1* 11/2013 Lim .................. H04N 19/44
                                                            375/240.16
2013/0322537 A1   12/2013 Rossato et al.
(Continued)

FOREIGN PATENT DOCUMENTS

CN        103583044 A      2/2014
KR        100772576 B1    11/2007
(Continued)

*Primary Examiner* — Samuel D Fereja

(74) *Attorney, Agent, or Firm* — BROADVIEW IP LAW, PC

(57) ABSTRACT

The present specification discloses a method of decoding an image. The method includes obtaining a motion vector of a collocated block included in a reference picture of a current block in a temporal motion buffer; changing a format of the obtained motion vector; and deriving the motion vector, in which the format is changed, into a temporal motion vector of the current block.

7 Claims, 29 Drawing Sheets

(51) Int. Cl.
  *H04N 19/184*  (2014.01)
  *H04N 19/31*  (2014.01)
  *H04N 19/43*  (2014.01)
  *H04N 19/513*  (2014.01)
  *H04N 19/85*  (2014.01)

(52) U.S. Cl.
  CPC ........... *H04N 19/184* (2014.11); *H04N 19/31* (2014.11); *H04N 19/43* (2014.11); *H04N 19/85* (2014.11)

(56) References Cited

U.S. PATENT DOCUMENTS

| | | |
|---|---|---|
| 2013/0329795 A1 | 12/2013 | Tourapis et al. |
| 2018/0098074 A1 | 4/2018 | Heo et al. |
| 2019/0149837 A1* | 5/2019 | Lim .................... H04N 19/513 375/240.16 |

FOREIGN PATENT DOCUMENTS

| | | |
|---|---|---|
| KR | 1020120088611 A | 8/2012 |
| KR | 1020120126078 A | 11/2012 |
| KR | 1020130065673 A | 6/2013 |
| KR | 1020170126918 A | 11/2017 |
| KR | 1020180044969 A | 5/2018 |
| WO | 2001086962 A1 | 11/2001 |
| WO | 2012044076 A2 | 4/2012 |
| WO | 2017041676 A1 | 3/2017 |

\* cited by examiner

FIG. 9

| | Descriptor |
|---|---|
| prediction_unit( x0, y0, log2PUWidth, log2PUHeight ) { | |
|   if( skip_flag[ x0 ][ y0 ] ) { | |
|     if( NumMVPCand( L0 ) > 1 ) | |
|       mvp_idx_l0[ x0 ][ y0 ] | ue(v) \| ae(v) |
|     if( NumMVPCand( L1 ) > 1 ) | |
|       mvp_idx_l1[ x0 ][ y0 ] | ue(v) \| ae(v) |
|   } else if( PredMode == MODE_INTRA ) { | |
|     ... | |
|   } else { /* MODE_MERGE, MODE_INTER */ | |
|     if( merge_flag[ x0 ][ y0 ] && NumMergeCandidates > 1 ) { | |
|       ... | |
|     } else { | |
|       if( inter_pred_idc[ x0 ][ y0 ] != Pred_L1 ) { | |
|         if( NumMVPCand( L0 ) > 1 ) | |
|           mvp_idx_l0 | ue(v) \| ae(v) |
|       } | |
|       if( inter_pred_idc[ x0 ][ y0 ] != Pred_L0 ) { | |
|         if( NumMVPCand( L1 ) > 1 ) | |
|           mvp_idx_l1 | ue(v) \| ae(v) |
|       } | |
|     } | |
|   } | |
| } | |

FIG. 10

| seq_parameter_set_rbsp( ) { | C | Descriptor |
|---|---|---|
|   ... | | |
|   motion_vector_buffer_comp_flag | 0 | u(1) |
|   if( motion_vector_buffer_comp_flag ) | | |
|     motion_vector_buffer_comp_ratio_log2 | 0 | u(8) |
|   rbsp_trailing_bits( ) | 0 | |
| } | | |

FIG. 21

| seq_parameter_set_rbsp() { | C | Descriptor |
|---|---|---|
| ..... | | |
| bit_width_temporal_motion_vector_minus8 | 0 | se(v) |
| ..... | | |
| rbsp_trailing_bits() | 0 | |
| } | | |

FIG. 22

| seq_parameter_set_rbsp() { | C | Descriptor |
|---|---|---|
| ..... | | |
| motion_vector_buffer_comp_flag | 0 | u(1) |
| if( motion_vector_buffer_comp_flag ) | | |
|    motion_vector_buffer_comp_ratio_log2 | 0 | u(8) |
| bit_depth_temporal_motion_vector_constraint_flag | 0 | u(1) |
| if(bit_depth_temporal_motion_vector_constraint_flag) | | |
|    bit_depth_temporal_motion_vector_minus8 | 0 | se(v) |
| ..... | | |
| rbsp_trailing_bits() | 0 | |
| } | | |

FIG. 23

| seq_parameter_set_rbsp() { | C | Descriptor |
|---|---|---|
| ..... | | |
| bit_depth_temporal_motion_vector_constraint_flag | 0 | u(1) |
| if(bit_depth_temporal_motion_vector_constraint_flag) | | |
|    bit_depth_temporal_motion_vector_minus8 | 0 | se(v) |
| ..... | | |
| rbsp_trailing_bits() | 0 | |
| } | | |

FIG. 24

| seq_parameter_set_rbsp() { | C | Descriptor |
|---|---|---|
| ..... | | |
|     bit_depth_temporal_motion_vector_minus8 | 0 | se(v) |
| ..... | | |
|     rbsp_trailing_bits() | 0 | |
| } | | |

FIG. 25

| seq_parameter_set_rbsp() { | C | Descriptor |
|---|---|---|
| ..... | | |
|     bit_depth_temporal_motion_vector_constraint_flag | 0 | u(1) |
|     if(bit_depth_temporal_motion_vector_constraint_flag) { | | |
|         bit_depth_temporal_motion_vector_x_minus8 | 0 | se(v) |
|         bit_depth_temporal_motion_vector_y_minus8 | 0 | se(v) |
|     } | | |
| ..... | | |
|     rbsp_trailing_bits() | 0 | |
| } | | |

FIG. 26

| seq_parameter_set_rbsp() { | C | Descriptor |
|---|---|---|
| ..... | | |
|     motion_vector_buffer_comp_flag | 0 | u(1) |
|     if( motion_vector_buffer_comp_flag ) { | | |
|         motion_vector_buffer_comp_ratio_log2 | 0 | u(8) |
|         bit_depth_temporal_motion_vector_minus8 | 0 | se(v) |
|     } | | |
| ..... | | |
|     rbsp_trailing_bits() | 0 | |
| } | | |

FIG. 27

| LEVEL NUMBER | Max Temporal MV component bit width MaxTMVBitWidth |
|---|---|
| 1 | 8 |
| 1b | 8 |
| 1.1 | 8 |
| 1.2 | 8 |
| 1.3 | 8 |
| 2 | 8 |
| 2.1 | 8 |
| 2.2 | 8 |
| 3 | 8 |
| 3.1 | 10 |
| 3.2 | 10 |
| 4 | 10 |
| 4.1 | 10 |
| 4.2 | 10 |
| 5 | 10 |
| 5.1 | 10 |

FIG. 28

| LEVEL NUMBER | Max Temporal MV component bit depth MaxTMVBitDepth |
|---|---|
| 1 | 8 |
| 1b | 8 |
| 1.1 | 8 |
| 1.2 | 8 |
| 1.3 | 8 |
| 2 | 8 |
| 2.1 | 8 |
| 2.2 | 8 |
| 3 | 8 |
| 3.1 | 10 |
| 3.2 | 10 |
| 4 | 10 |
| 4.1 | 10 |
| 4.2 | 10 |
| 5 | 10 |
| 5.1 | 10 |

FIG. 29

| seq_parameter_set_rbsp() { | C | Descriptor |
|---|---|---|
| ..... | | |
| delta_bit_width_temporal_motion_vector_minus8 | 0 | se(v) |
| ..... | | |
| rbsp_trailing_bits() | 0 | |
| } | | |

FIG. 30

| Level Number | Max macroblock processing rate MaxMBPS (MB/s) | Max picture size MaxFS (MB/s) | Max decoded picture buffer size MaxDpbMbs (MB/s) | Max video bit rate MaxBR (1000 bits/s, 1200 bits/s, cpbBrVclFactor bits/s, or cpbBrNalFactor bits/s) | Max CPB size MaxCPB (1000 bits, 1200 bits, cpbBrVclFactor bits, or cpbBrNalFactor bits) | Max Temporal MV component range MaxTmvR (luma picture samples) | Min compression ratio MinCR | Max number of motion vectors per two consecutive MBs) MaxMvsPer2Mb |
|---|---|---|---|---|---|---|---|---|
| 1 | 1 485 | 99 | 396 | 64 | 175 | [-64,+63.75] | 2 | - |
| 1b | 1 485 | 99 | 396 | 128 | 350 | [-64,+63.75] | 2 | - |
| 1.1 | 3 000 | 396 | 900 | 192 | 500 | [-128,+127.75] | 2 | - |
| 1.2 | 6 000 | 396 | 2 376 | 384 | 1 000 | [-128,+127.75] | 2 | - |
| 1.3 | 11 880 | 396 | 2 376 | 768 | 2 000 | [-128,+127.75] | 2 | - |
| 2 | 11 880 | 396 | 2 376 | 2 000 | 2 000 | [-128,+127.75] | 2 | - |
| 2.1 | 19 800 | 792 | 4 752 | 4 000 | 4 000 | [-256,+255.75] | 2 | - |
| 2.2 | 20 250 | 1 620 | 8 100 | 4 000 | 4 000 | [-256,+255.75] | 2 | - |
| 3 | 40 500 | 1 620 | 8 100 | 10 000 | 10 000 | [-256,+255.75] | 2 | 32 |
| 3.1 | 108 000 | 3 600 | 18 000 | 14 000 | 14 000 | [-512,+511.75] | 4 | 16 |
| 3.2 | 216 000 | 5 120 | 20 480 | 20 000 | 20 000 | [-512,+511.75] | 4 | 16 |
| 4 | 245 760 | 8 192 | 32 768 | 20 000 | 25 000 | [-512,+511.75] | 4 | 16 |
| 4.1 | 245 760 | 8 192 | 32 768 | 50 000 | 62 500 | [-512,+511.75] | 2 | 16 |
| 4.2 | 522 240 | 8 704 | 34 816 | 50 000 | 62 500 | [-512,+511.75] | 2 | 16 |
| 5 | 589 824 | 22 080 | 110 400 | 135 000 | 135 000 | [-512,+511.75] | 2 | 16 |
| 5.1 | 983 040 | 36 864 | 184 320 | 240 000 | 240 000 | [-512,+511.75] | 2 | 16 |

FIG. 31

| Level Number | Max macroblock processing rate MaxMBPS (MB/s) | Max picture size MaxFS (MB/s) | Max decoded picture buffer size MaxDpbMbs (MB/s) | Max video bit rate MaxBR (1000 bits/s, 1200 bits/s, cpbBrVclFactor bits/s, or cpbBrNalFactor bits/s) | Max CPB size MaxCPB (1000 bits, 1200 bits, cpbBrVclFactor bits, or cpbBrNalFactor bits) | Max Temporal MV component bit width MaxTMVBitWidth | Min compression ratio MinCR | Max number of motion vectors per two consecutive MBs) MaxMvsPer2Mb |
|---|---|---|---|---|---|---|---|---|
| 1 | 1 485 | 99 | 396 | 64 | 175 | 8 | 2 | - |
| 1b | 1 485 | 99 | 396 | 128 | 350 | 8 | 2 | - |
| 1.1 | 3 000 | 396 | 900 | 192 | 500 | 8 | 2 | - |
| 1.2 | 6 000 | 396 | 2 376 | 384 | 1 000 | 8 | 2 | - |
| 1.3 | 11 880 | 396 | 2 376 | 768 | 2 000 | 8 | 2 | - |
| 2 | 11 880 | 396 | 2 376 | 2 000 | 2 000 | 8 | 2 | - |
| 2.1 | 19 800 | 792 | 4 752 | 4 000 | 4 000 | 8 | 2 | - |
| 2.2 | 20 250 | 1 620 | 8 100 | 4 000 | 4 000 | 8 | 2 | - |
| 3 | 40 500 | 1 620 | 8 100 | 10 000 | 10 000 | 8 | 2 | 32 |
| 3.1 | 108 000 | 3 600 | 18 000 | 14 000 | 14 000 | 10 | 4 | 16 |
| 3.2 | 216 000 | 5 120 | 20 480 | 20 000 | 20 000 | 10 | 4 | 16 |
| 4 | 245 760 | 8 192 | 32 768 | 20 000 | 25 000 | 10 | 4 | 16 |
| 4.1 | 245 760 | 8 192 | 32 768 | 50 000 | 62 500 | 10 | 2 | 16 |
| 4.2 | 522 240 | 8 704 | 34 816 | 50 000 | 62 500 | 10 | 2 | 16 |
| 5 | 589 824 | 22 080 | 110 400 | 135 000 | 135 000 | 10 | 2 | 16 |
| 5.1 | 983 040 | 36 864 | 184 320 | 240 000 | 240 000 | 10 | 2 | 16 |

FIG. 32

| Level Number | Max macroblock processing rate MaxMBPS (MB/s) | Max picture size MaxFS (MB/s) | Max decoded picture buffer size MaxDpbMbs (MB/s) | Max video bit rate MaxBR (1000 bits/s, 1200 bits/s, cpbBrVclFactor bits/s, or cpbBrNalFactor bits/s) | Max CPB size MaxCPB (1000 bits, 1200 bits, cpbBrVclFactor bits, or cpbBrNalFactor bits) | Max Temporal MV component bit width MaxTMVBitWidth | Min compression ratio MinCR | Max number of motion vectors per two consecutive MBs MaxMvsPer2Mb |
|---|---|---|---|---|---|---|---|---|
| 1 | 1 485 | 99 | 396 | 64 | 175 | 6 | 2 | -- |
| 1b | 1 485 | 99 | 396 | 128 | 350 | 6 | 2 | -- |
| 1.1 | 3 000 | 396 | 900 | 192 | 500 | 7 | 2 | -- |
| 1.2 | 6 000 | 396 | 2 376 | 384 | 1 000 | 7 | 2 | -- |
| 1.3 | 11 880 | 396 | 2 376 | 768 | 2 000 | 7 | 2 | -- |
| 2 | 11 880 | 396 | 2 376 | 2 000 | 2 000 | 7 | 2 | -- |
| 2.1 | 19 800 | 792 | 4 752 | 4 000 | 4 000 | 8 | 2 | -- |
| 2.2 | 20 250 | 1 620 | 8 100 | 4 000 | 4 000 | 8 | 2 | -- |
| 3 | 40 500 | 1 620 | 8 100 | 10 000 | 10 000 | 9 | 2 | 32 |
| 3.1 | 108 000 | 3 600 | 18 000 | 14 000 | 14 000 | 10 | 4 | 16 |
| 3.2 | 216 000 | 5 120 | 20 480 | 20 000 | 20 000 | 10 | 4 | 16 |
| 4 | 245 760 | 8 192 | 32 768 | 20 000 | 25 000 | 10 | 4 | 16 |
| 4.1 | 245 760 | 8 192 | 32 768 | 50 000 | 62 500 | 10 | 2 | 16 |
| 4.2 | 522 240 | 8 704 | 34 816 | 50 000 | 62 500 | 10 | 2 | 16 |
| 5 | 589 824 | 22 080 | 110 400 | 135 000 | 135 000 | 10 | 2 | 16 |
| 5.1 | 983 040 | 36 864 | 184 320 | 240 000 | 240 000 | 10 | 2 | 16 |

FIG. 33

| LEVEL NUMBER | Max Temporal MV component bit width MaxTMVBitWidth |
|---|---|
| 1 | 8 |
| 1b | 8 |
| 1.1 | 8 |
| 1.2 | 8 |
| 1.3 | 8 |
| 2 | 8 |
| 2.1 | 8 |
| 2.2 | 8 |
| 3 | 8 |
| 3.1 | 10 |
| 3.2 | 10 |
| 4 | 10 |
| 4.1 | 10 |
| 4.2 | 10 |
| 5 | 10 |
| 5.1 | 10 |

FIG. 34

| Level Number | Max macroblock processing rate MaxMBPS (MB/s) | Max picture size MaxFS (MB/s) | Max decoded picture buffer size MaxDpbMbs (MB/s) | Max video bit rate MaxBR (1000 bits/s, 1200 bits/s, cpbBrVclFactor bits/s, or cpbBrNalFactor bits/s) | Max CPB size MaxCPB (1000 bits, 1200 bits, cpbBrVclFactor bits, or cpbBrNalFactor bits) | Max Vertical Temporal MV component bit depth MaxTMVYBitWidth | Min compression ratio MinCR | Max number of motion vectors per two consecutive MBs MaxMvsPer2Mb |
|---|---|---|---|---|---|---|---|---|
| 1 | 1 485 | 99 | 396 | 64 | 175 | 8 | 2 | – |
| 1b | 1 485 | 99 | 396 | 128 | 350 | 8 | 2 | – |
| 1.1 | 3 000 | 396 | 900 | 192 | 500 | 8 | 2 | – |
| 1.2 | 6 000 | 396 | 2 376 | 384 | 1 000 | 8 | 2 | – |
| 1.3 | 11 880 | 396 | 2 376 | 768 | 2 000 | 8 | 2 | – |
| 2 | 11 880 | 396 | 2 376 | 2 000 | 2 000 | 8 | 2 | – |
| 2.1 | 19 800 | 792 | 4 752 | 4 000 | 4 000 | 8 | 2 | – |
| 2.2 | 20 250 | 1 620 | 8 100 | 4 000 | 4 000 | 8 | 2 | – |
| 3 | 40 500 | 1 620 | 8 100 | 10 000 | 10 000 | 8 | 2 | 32 |
| 3.1 | 108 000 | 3 600 | 18 000 | 14 000 | 14 000 | 10 | 4 | 16 |
| 3.2 | 216 000 | 5 120 | 20 480 | 20 000 | 20 000 | 10 | 4 | 16 |
| 4 | 245 760 | 8 192 | 32 768 | 20 000 | 25 000 | 10 | 4 | 16 |
| 4.1 | 245 760 | 8 192 | 32 768 | 50 000 | 62 500 | 10 | 2 | 16 |
| 4.2 | 522 240 | 8 704 | 34 816 | 50 000 | 62 500 | 10 | 2 | 16 |
| 5 | 589 824 | 22 080 | 110 400 | 135 000 | 135 000 | 10 | 2 | 16 |
| 5.1 | 983 040 | 36 864 | 184 320 | 240 000 | 240 000 | 10 | 2 | 16 |

| pic_parameter_set_rbsp() { | Descriptor |
|---|---|
| ... | |
| motion_info_stored_flag | u(1) |
| ... | ... |
| } | |

| slice_segment_header() { | Descriptor |
|---|---|
| ... | |
| if( slice_type == B ) | |
|     collocated_from_l0_flag | u(1) |
| if( ( collocated_from_l0_flag && num_ref_idx_l0_active_minus1 > 0 ) \|\| | |
|   ( !collocated_from_l0_flag && num_ref_idx_l1_active_minus1 > 0 ) ) | |
|     collocated_ref_idx | ue(v) |
| ... | |

FIG. 41

| | Descriptor |
|---|---|
| st_ref_pic_set( stRpsIdx ) { | |
|   if( stRpsIdx != 0 ) | |
|     inter_ref_pic_set_prediction_flag | u(1) |
|   if( inter_ref_pic_set_prediction_flag ) { | |
|     if( stRpsIdx == num_short_term_ref_pic_sets ) | |
|       delta_idx_minus1 | ue(v) |
|     delta_rps_sign | u(1) |
|     abs_delta_rps_minus1 | ue(v) |
|     for( j = 0; j <= NumDeltaPocs[ RefRpsIdx ]; j++ ) { | |
|       used_by_curr_pic_flag[ j ] | u(1) |
|       motion_used_by_curr_pic_flag[ j ] | u(1) |
|       if( !used_by_curr_pic_flag[ j ] ) | |
|         use_delta_flag[ j ] | u(1) |
|     } | |
|   } else { | |
|     num_negative_pics | ue(v) |
|     num_positive_pics | ue(v) |
|     for( i = 0; i < num_negative_pics; i++ ) { | |
|       delta_poc_s0_minus1[ i ] | ue(v) |
|       used_by_curr_pic_s0_flag[ i ] | u(1) |
|       motion_used_by_curr_pic_s0_flag[ i ] | u(1) |
|     } | |
|     for( i = 0; i < num_positive_pics; i++ ) { | |
|       delta_poc_s1_minus1[ i ] | ue(v) |
|       motion_used_by_curr_pic_s1_flag[ i ] | u(1) |
|     } | |
|   } | |
| } | |

FIG. 42

| st_ref_pic_set( stRpsIdx ) { | Descriptor |
|---|---|
|   if( stRpsIdx != 0 ) | |
|     inter_ref_pic_set_prediction_flag | u(1) |
|   if( inter_ref_pic_set_prediction_flag ) { | |
|     if( stRpsIdx == num_short_term_ref_pic_sets ) | |
|       delta_idx_minus1 | ue(v) |
|     delta_rps_sign | u(1) |
|     abs_delta_rps_minus1 | ue(v) |
|     for( j = 0; j <= NumDeltaPocs[ RefRpsIdx ]; j++ ) { | |
|       used_by_curr_pic_flag[ j ] | u(1) |
|       if( !used_by_curr_pic_flag[ j ] ) | |
|         use_delta_flag[ j ] | u(1) |
|     } | |
|   } else { | |
|     num_negative_pics | ue(v) |
|     num_positive_pics | ue(v) |
|     for( i = 0; i < num_negative_pics; i++ ) { | |
|       delta_poc_s0_minus1[ i ] | ue(v) |
|       used_by_curr_pic_s0_flag[ i ] | u(1) |
|     } | |
|     for( i = 0; i < num_positive_pics; i++ ) { | |
|       delta_poc_s1_minus1[ i ] | ue(v) |
|       used_by_curr_pic_s1_flag[ i ] | u(1) |
|     } | |
|   } | |
| } | |

IMAGE ENCODING/DECODING METHOD AND APPARATUS, AND RECORDING MEDIUM STORING BITSTREAM

CROSS-REFERENCE TO RELATED APPLICATION

This application is a continuation of U.S. application Ser. No. 17/277,186, filed on Nov. 5, 2021, which is a National Stage Entry of PCT International Application No. PCT/KR2019/012008, filed on Sep. 17, 2019, which claims priority to Korean Patent Application No. 10-2018-0111092, filed on Sep. 17, 2018, the entire contents of which are hereby incorporated by references in its entirety.

TECHNICAL FIELD

The present invention relates to a method and apparatus for encoding/decoding an image and a recording medium for storing a bitstream. More particularly, the present invention relates to a method and apparatus for encoding/decoding an image, which uses a temporal motion information.

BACKGROUND ART

Recently, demands for high resolution and high quality images such as high definition (HD) images and ultra-high definition (UHD) images are increasing in various application fields. As the image data becomes high resolution and high quality, the amount of data increases relative to the existing image data. Therefore, when image data is transmitted using a medium such as a wired/wireless broadband line or stored using a storage medium in the related art, transmission and storage costs increase. In order to solve these problems caused as the image data becomes high resolution and high quality, a high efficiency image encoding/decoding technique is required for an image having a higher resolution and quality.

As the image compression technique, various techniques exist, such as an inter prediction technique for predicting pixel values included in a current picture from a picture before or after the current picture, an intra prediction technique for predicting pixel values included in the current picture by using pixel information in the current picture, and a transforming and quantizing technique for compressing the energy of the residual signal, and an entropy encoding technique for allocating a short code to a value having a high frequency of occurrence and a long code to a value having a low frequency of occurrence. Such image compression technologies can be used to effectively compress and transmit or store image data.

DISCLOSURE

Technical Problem

An objective of the present invention is to provide a method and apparatus for encoding/decoding an image and a recording medium storing a bitstream, which have an improved compression efficiency by using a clipped motion vector.

It is an objective of the present invention to provide a method of clipping a motion vector.

An objective of the present invention is to provide a method of transmitting information on a motion vector.

An objective of the present invention is to provide a method of storing and using temporal motion information.

Technical Solution

A method of decoding an image according to an embodiment of the present invention, the method may comprise obtaining a motion vector of a collocated block included in a reference picture of a current block in a temporal motion buffer; changing a format of the obtained motion vector; and deriving the motion vector, in which the format is changed, into a temporal motion vector of the current block.

In the method of decoding an image according to the present invention, wherein the changing of the format of the obtained motion vector includes: changing the format of the obtained motion vector to a format having an increased bit depth.

In the method of decoding an image according to the present invention, wherein the changing of the format of the obtained motion vector includes: changing the format of the obtained motion vector to a predetermined format.

In the method of decoding an image according to the present invention, wherein the format of the obtained motion vector is a floating point format.

In the method of decoding an image according to the present invention, wherein the changing of the format of the obtained motion vector includes: changing the format of the obtained motion vector to a fixed bit format including a sign.

In the method of decoding an image according to the present invention, further comprising: scaling the derived temporal motion vector; and limiting a dynamic range of the scaled temporal motion vector.

In the method of decoding an image according to the present invention, wherein the limiting of the dynamic range of the scaled temporal motion vector includes: limiting the dynamic range of the scaled temporal motion vector to a fixed bit depth.

In the method of decoding an image according to the present invention, wherein the fixed bit depth is 18 bits.

A method of encoding an image according to an embodiment of the present invention, the method may comprise obtaining a motion vector of a collocated block included in a reference picture of a current block in a temporal motion buffer; changing a format of the obtained motion vector; and deriving the motion vector, in which the format is changed, into a temporal motion vector of the current block.

In the method of encoding an image according to the present invention, wherein the changing of the format of the obtained motion vector includes: changing the format of the obtained motion vector to a format having an increased bit depth.

In the method of encoding an image according to the present invention, wherein the changing of the format of the obtained motion vector includes: changing the format of the obtained motion vector to a predetermined format.

In the method of encoding an image according to the present invention, wherein the format of the obtained motion vector is a floating point format.

In the method of encoding an image according to the present invention, wherein the changing of the format of the obtained motion vector includes: changing the format of the obtained motion vector to a fixed bit format including a sign.

In the method of encoding an image according to the present invention, further comprising: scaling the derived temporal motion vector; and limiting a dynamic range of the scaled temporal motion vector.

In the method of encoding an image according to the present invention, wherein the limiting of the dynamic range of the scaled temporal motion vector includes: limiting the dynamic range of the scaled temporal motion vector to a fixed bit depth.

In the method of encoding an image according to the present invention, wherein the fixed bit depth is 18 bits.

In computer-readable non-transitory recording medium including a bitstream decoded by an image decoding apparatus, wherein the bitstream includes index information indicating a collocated picture for deriving a temporal motion vector among reference pictures of a current block; the image decoding apparatus obtains a collocated picture including a collocated block of the current block by using the index information; and the temporal motion vector is derived by changing a format of a motion vector of the collocated block.

Advantageous Effects

According to the present invention, an image may be encoded/decoded using the clipped motion vector.

According to the present invention, it is possible to reduce the size of the memory space required to store the motion vector.

According to the present invention, the memory access bandwidth required to retrieve data from the memory can be reduced.

According to the present invention, it is possible to reduce a required size of memory space by storing and using motion information of a specific reference picture.

According to the present invention, it is possible to improve encoding and decoding efficiency of an image.

According to the present invention, the computational complexity of the encoder and decoder of an image can be reduced.

DESCRIPTION OF DRAWINGS

FIG. 9 is a diagram illustrating a motion vector predictor index with respect to a reference picture list.

FIG. 10 is a diagram for describing information related to a spatial resolution of a motion vector.

FIG. 21 is a diagram illustrating information about a bit width of a temporal motion vector component.

FIGS. 22 to 26 are diagrams illustrating information about a bit depth of a temporal motion vector.

FIGS. 27 and 28 are diagram illustrating an example of defining a bit width and a bit depth of a temporal motion vector at a codec level in a temporal motion vector derivation process.

FIG. 29 is a diagram illustrating information about a difference in bit width of a temporal motion vector component.

FIG. 30 is a diagram illustrating an example of defining a dynamic range of a temporal motion vector component at a codec level.

FIGS. 31 to 33 are diagrams illustrating an example of defining a bit width of each component of a temporal motion vector at a codec level.

FIG. 34 is a diagram illustrating an example of defining a bit width of a temporal motion vector Y component at a codec level.

FIGS. 41 and 42 are diagrams illustrating information about whether a specific reference picture is used in the current picture and information about whether motion information of the specific reference picture is used in the current picture.

MODE FOR INVENTION

Figure 1:
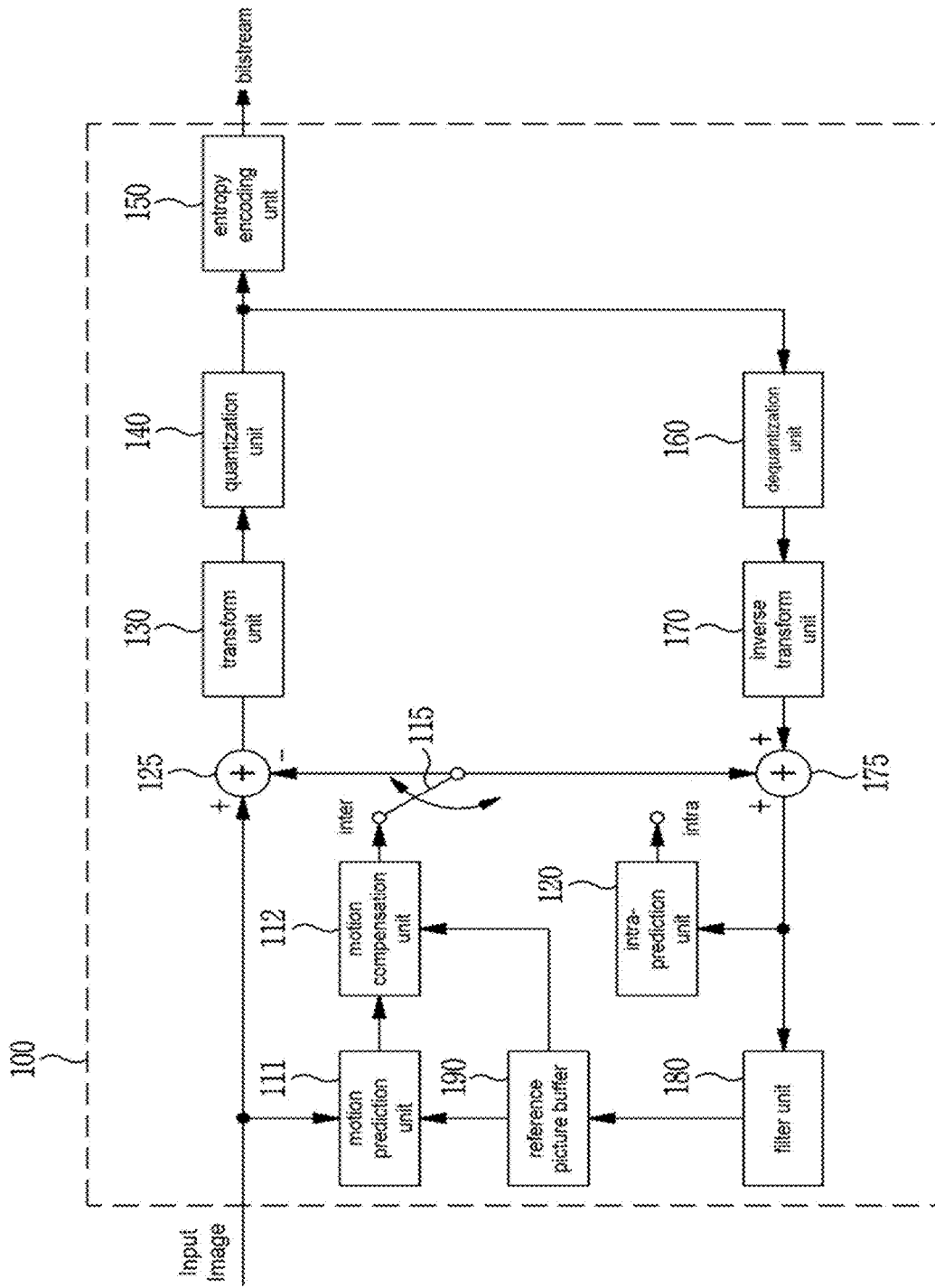
FIG. 1 is a block diagram illustrating a configuration of an encoding apparatus according to an embodiment of the present invention

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. Various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture" and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

DESCRIPTION OF TERMS

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd-1}$ according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quarternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of coding blocks and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

Parsing: may mean determination of a value of a syntax element by performing entropy decoding or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list: may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator: may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag: indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index: may refer to an index indicating a specific reference picture in a reference picture list.

Reference picture: may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector: may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range: may be a two-dimensional region which is searched to retrieve a motion vector during inter prediction. For example, the size of the search range may be M×N. Here, M and N are both integers.

Motion vector candidate: may refer to a prediction candidate block or a motion vector of the prediction candidate block when predicting a motion vector. In addition, a motion vector candidate may be included in a motion vector candidate list.

Motion vector candidate list: may mean a list composed of one or more motion vector candidates.

Motion vector candidate index: may mean an indicator indicating a motion vector candidate in a motion vector candidate list. Alternatively, it may be an index of a motion vector predictor.

Motion information: may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list: may mean a list composed of one or more merge candidates.

Merge candidate: may mean a spatial merge candidate, a temporal merge candidate, a combined merge candidate, a combined bi-predictive merge candidate, or a zero-merge candidate. The merge candidate may include motion information such as an inter prediction indicator, a reference picture index for each list, a motion vector, a prediction list utilization flag, and an inter prediction indicator.

Merge index: may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode.

Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
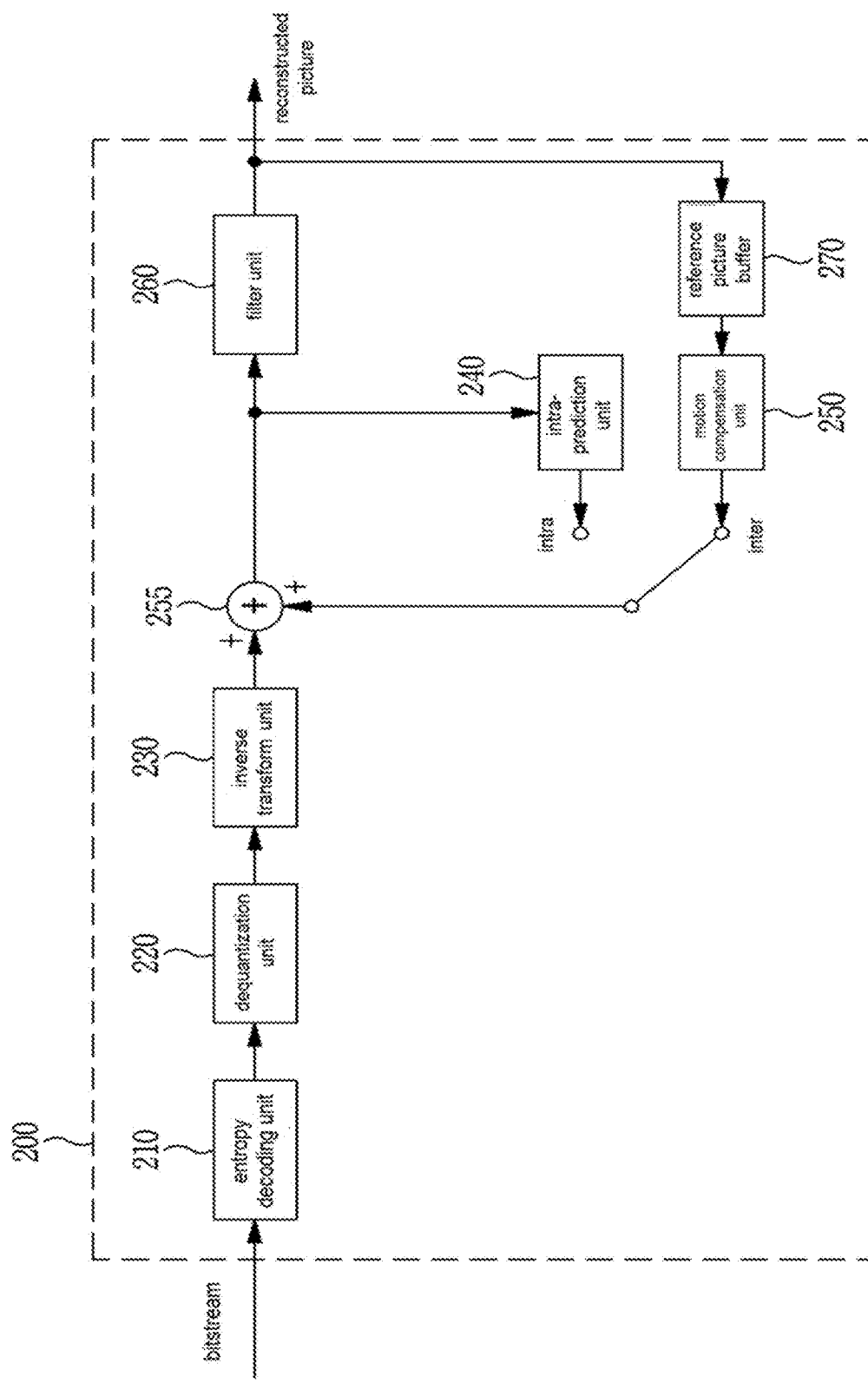
FIG. 2 is a block diagram illustrating a configuration of a decoding apparatus according to an embodiment of the present invention.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
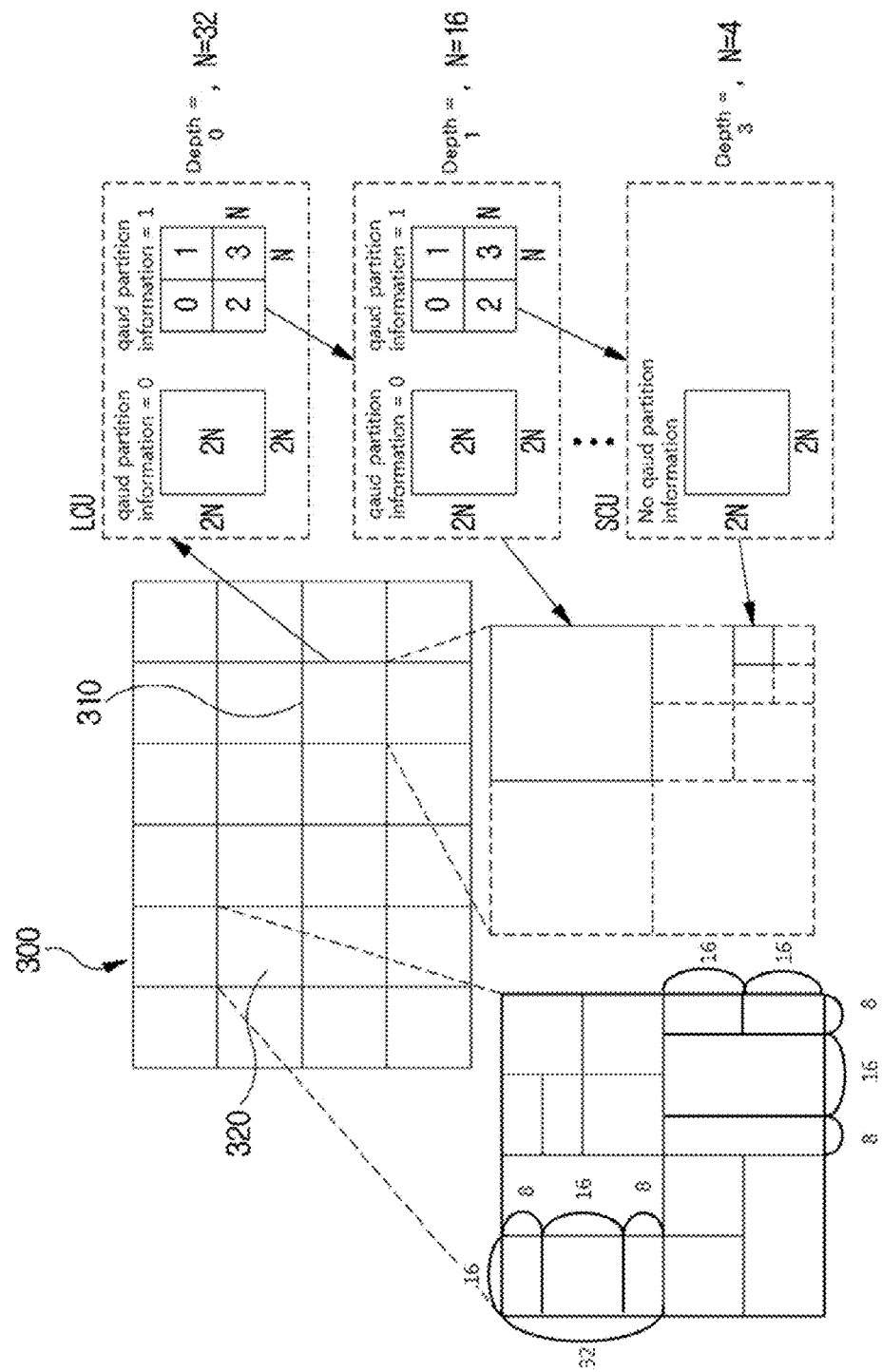
FIG. 3 is a diagram schematically illustrating a division structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2 N×2 N. Also, in case of a CU which is partitioned, a CU with a size of 2 N×2 N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
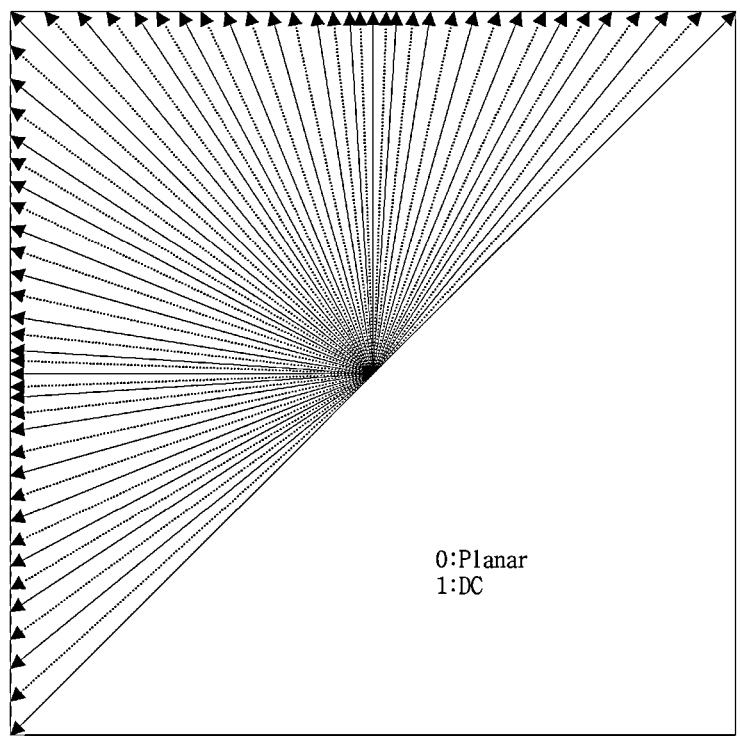
FIG. 4 is a diagram illustrating an embodiment of an intra prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
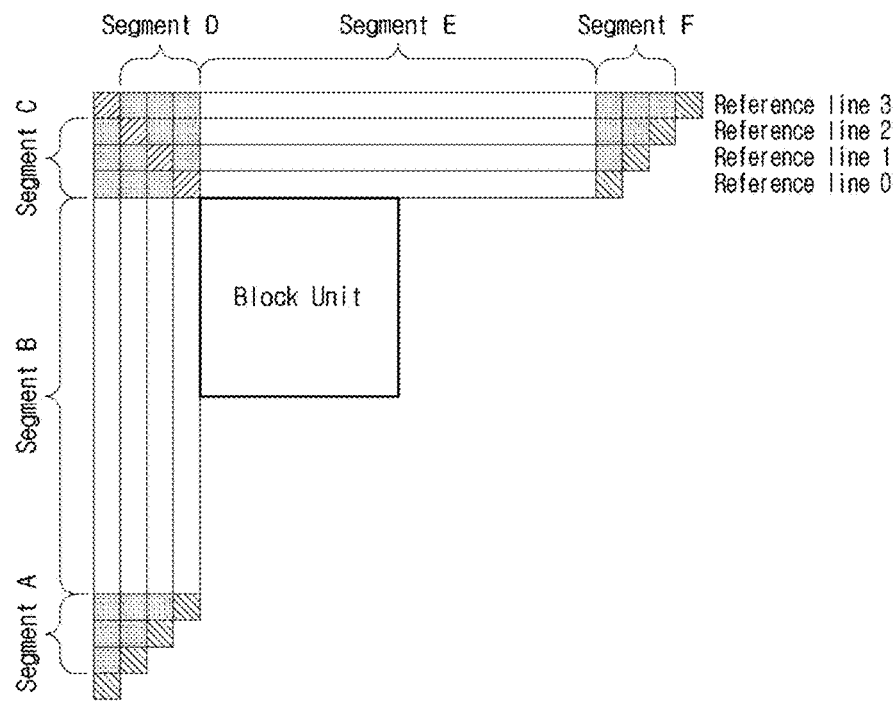
FIG. 7 is a diagram illustrating reference samples available for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
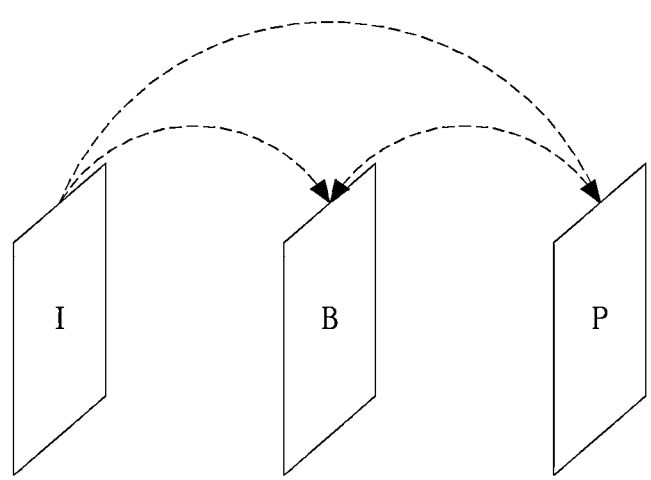
FIG. 5 is a diagram illustrating an embodiment of an inter prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangle partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
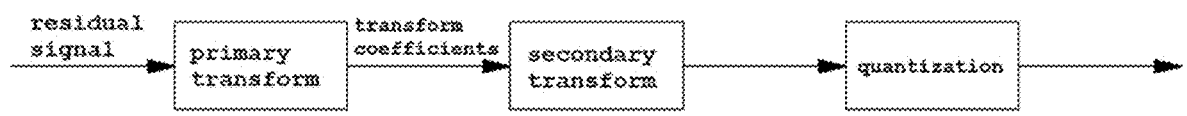
FIG. 6 is a diagram illustrating a process of transform and quantization.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loeve transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Hereinafter, a method of decoding/encoding an image according to an embodiment of the present invention will be described.

A motion vector prediction method based on advanced motion vector prediction may use not only a motion vector (MV) of a reconstructed block located in the spatial periphery of a encoding/decoding target block, but also a motion vector of a block existing at the same position or corresponding position as the encoding/decoding target block in the reference picture.

Herein, a block that is present at the reference picture or at the same position as the encoding/decoding target block in the reference picture or the adjacent position or spatially corresponding position in the same position as the encoding/decoding target block in the reference picture may be called a collocated block and a collocated block. Herein, the collocated block may be a block necessarily located at the same position as the encoding/decoding target block of the reference picture, as well as a block present at the position similar, i.e., the position corresponding, to that of the encoding/decoding target block. Here, the block having similar position to that of the encoding/decoding target block may include a block adjacent to the encoding/decoding target block.

In addition, the picture which is an induction target of the temporal motion vector may be referred to as a collocated picture. That is, the collocated picture may mean a picture in which the motion vector is stored for the current picture. In addition, the collocated picture may store a motion vector difference value for the current picture. In addition, a collocated picture may store a seed vector or an affine control point vector for deriving an affine model for the current picture.

In the motion information merging method, the motion information may be inferred not only from the reconstructed block located in the spatial vicinity, but also from the collocated block, and used as the motion information of the encoding/decoding target block. In this case, the motion information may include at least one or more pieces of inter prediction mode information indicating a reference picture index, a motion vector, a uni-direction or a bi-direction, etc., that are required for inter prediction, a reference picture list, prediction mode information regarding whether to be coded in an intra prediction mode or whether to be coded in an inter prediction mode.

The predicted motion vector in the encoding/decoding target block may be a motion vector of a neighboring block spatially adjacent to the encoding/decoding target block, as well as a motion vector of a collocated block that is a block temporally adjacent to the encoding/decoding target block.

Figure 8:
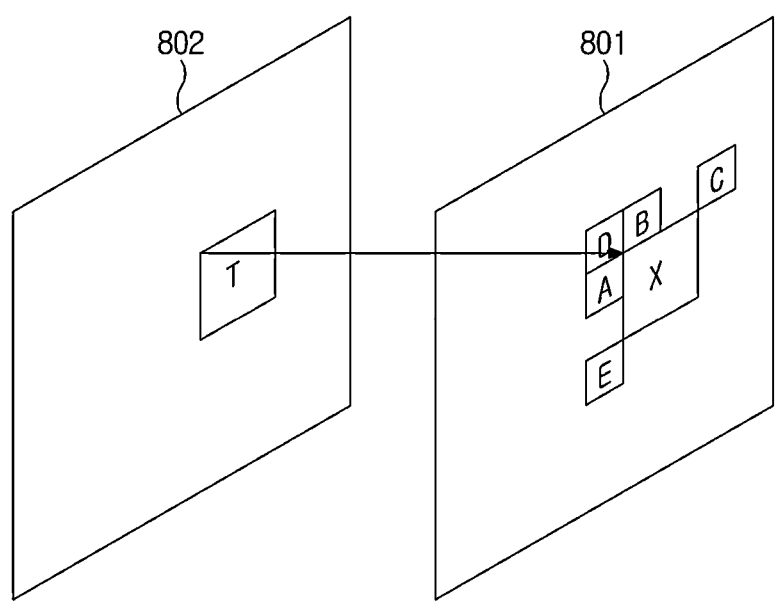
FIG. 8 is a diagram illustrating an embodiment of an encoding/decoding target picture and reference picture.

FIG. 8 shows an example of an encoding/decoding target picture and a reference picture.

In FIG. 8, block X represents an encoding/decoding target block in an encoding/decoding target picture 801, and block A, block B, block C, block D, and block E represents a reconstructed block that is located around the encoding/decoding target block. The block T in the reference picture 802 indicates a collocated block present at a position corresponding to that of the encoding/decoding target block.

Which motion vector is used as the predicted motion vector in the encoding/decoding target block may be determined through the motion vector predictor index.

As shown in FIG. 9, the motion vector predictor index (mvp_idx_10, mvp_idx_11) for each reference picture list is transmitted to the decoding apparatus, and the decoding apparatus may use the same motion vector as a motion vector predicted by the encoding apparatus as a predicted motion vector.

When encoding/decoding the encoding/decoding target block using a motion vector of a neighboring block spatially adjacent to an encoding/decoding target block, the motion vector may be stored with only a memory having relatively small size.

However, when encoding/decoding the encoding/decoding target block using a temporal motion vector, since all motion vectors of the reference picture must be stored in a memory, a memory having relatively large size is required. In addition, the amount of memory access bandwidth required to retrieve data from the memory also increases. Therefore, it is necessary to store temporal motion vectors more efficiently in an application environment in which there is not enough memory space or power consumption should be minimized as in a portable receiving terminal.

Hereinafter, a motion vector storage method of efficiently storing a temporal motion vector will be described.

The spatial resolution of the motion vector can be reduced as a method of storing the motion vector in memory.

In the above method, the motion vector may be compressed at an arbitrary ratio and then and stored in a memory. For example, the number of motion vectors stored may be reduced by storing motion vectors stored in 4×4 block units in 4×4 or more block units. Herein, in order to adjust the block size of the stored motion vector, information about the compression ratio may be transmitted.

Information related to the spatial resolution of the motion vector may be transmitted in a sequence parameter set, a picture parameter set, a slice header, a tile header, a CTU, and a CU unit as shown in FIG. 10.

Referring to FIG. 10, when the motion_vector_buffer_comp_flag is 1, a motion vector buffer compression process may be performed.

motion_vector_buffer_comp_ratio_log 2 may indicate a compression ratio of a motion vector buffer compression process. When motion_vector_buffer_comp_ratio_log 2 does not exist, motion_vector_buffer_comp_ratio_log 2 is inferred to 0, and the motion vector buffer compression ratio may be expressed as Equation 1.

$$MVBufferCompRatio = 1 << motion\_vector\_buffer\_comp\_ratio\_log2 \qquad \text{[Equation 1]}$$

Herein, the spatial resolution may be set to a predetermined fixed value in the encoder/decoder without signaling the information about the spatial resolution. Here, the spatial resolution may be at least one of N×M forms (where N and M are positive integers) such as 4×4, 8×8, and 16×16.

In the encoder or the decoder, the motion vector of the reference picture with reduced spatial resolution may be used in at least one of processes using a motion vector of the reference picture, such as generating a motion vector candidate list and generating a merge candidate list. Here, the motion vector of the reference picture may mean a temporal motion vector.

Meanwhile, at least one unit of a sequence, a picture, a slice, a tile, a CTU, and a block may have spatial resolutions different from each other.

For example, a first picture may have a spatial resolution of 4×4 units and a second picture may have a spatial resolution of 16×16 units.

For example, a first tile in the picture may have a spatial resolution of 4×4 units and a second tile in the picture may have a spatial resolution of 16×16 units.

For example, a first CTU in the picture may have a spatial resolution of 4×4 units and a second CTU in the picture may have a spatial resolution of 16×16 units.

When at least one unit of a sequence, a picture, a slice, a tile, a CTU, and a block has spatial resolutions different from each other, information on spatial resolution in the corresponding unit may be entropy encoded/decoded.

For example, when all 4×4 blocks of a 1920×1080 (1080p) picture have different motion vectors, use two reference picture lists, and use two reference pictures for each list, a memory space of a total of 4.14 Mbytes may be required to store the temporal motion vector for the reference picture.

Bit depth of 32 bits per a motion vector
(1) Dynamic range of an X component of a motion vector: −32768 to +32767 (bit depth: 16 bits)
(2) Dynamic range of an Y component of the motion vector: −32768 to +32767 (bit depth: 16 bits)
When all 4×4 block units have different motion vectors from each other: 480×270=129600 blocks
Use two motion vectors for each block
the number of reference picture lists: two
Use two reference pictures for reference picture list
32 bits×129600 blocks×two motion vectors×two reference picture lists×two reference pictures=33177600 bits=4.14 Mbytes Considering the above five conditions, 4.14 Mbytes may be required as a memory space for storing a temporal motion vector.

According to a method of lowering the spatial resolution of the motion vector described above, the size of the required memory space and the memory access bandwidth can be reduced by using the spatial correlation of the motion vector.

When the size of the memory space is reduced to ¼, the size of the memory space required in the above example is reduced to about 1.0 Mbytes. Herein, when only 6 bits is used for each component of the motion vector as a bit depth required for storing the motion vector by additionally limiting the dynamic range of the motion vector, the required memory space may be further reduced to 0.375 Mbytes.

Therefore, a method of reducing the bit depth of the motion vector will be described hereinafter, in order to reduce the size of the memory space required to store the motion vector and the memory access bandwidth required to retrieve data from the memory.

For example, it is possible to reduce the bit depth of the motion vector by limiting the dynamic range of the motion vector.

As another example, it is possible to reduce the bit depth of the motion vector by changing the format of the motion vector. In addition, it is possible to increase the bit depth of the motion vector by changing the format of the motion vector again.

Hereinafter, the dynamic range of the motion vector means a section between the minimum value and the maximum value that the negative or positive components of the motion vector with respect to zero, and the bit depth indicates a size of the space required to store the motion vector and also indicates a bit width. In addition, unless otherwise specified, a motion vector may mean a motion vector of a reference picture, that is, a temporal motion vector.

When each component of the motion vector is out of a dynamic range, each component may be expressed as a minimum or maximum value of the dynamic range. For example, when an X component of the motion vector is 312 and the maximum value of the dynamic range of each component of the motion vector is 255, the X component of the motion vector may be limited to 255.

Likewise, in the case that the bit depth of each component of the motion vector is 16 bits and the motion vector is (−36, 24), when the bit depth of each component of the motion vector is limited to 6 bits, each component has a dynamic range of −32 to +31, so that the motion vector may be represented as (−32, 24) that is within the dynamic range.

Further, in the case that the bit depth of each component of the motion vector is 16 bits, and the motion vector is (−49, 142), when the bit depth of each component of the motion vector is limited to 9 bits, each component has a dynamic range of −256 to +255, so that the motion vector may be represented as (−49, 142) without change.

Figure 11:
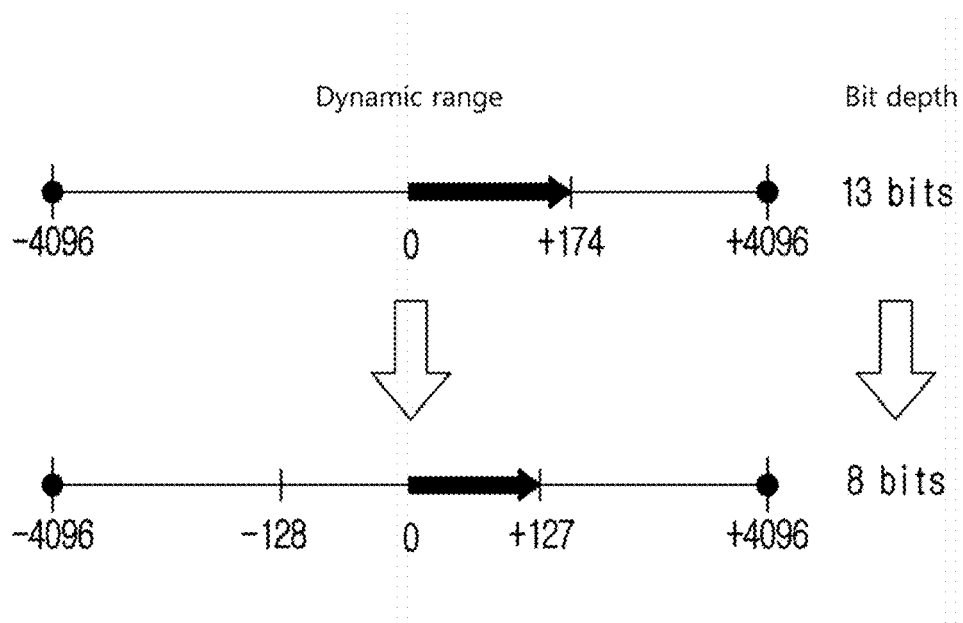
FIG. 11 is a diagram illustrating an example of limiting a dynamic range of a motion vector.

FIG. 11 is a diagram illustrating an example of limiting a dynamic range of a motion vector.

Referring to FIG. 11, when a dynamic range of a motion vector having a dynamic range of −4096 to +4095 is limited to −128 to +127, the bit depth may be reduced from 13 bits to 8 bits.

Each component of the temporal motion vector may be clipped, such as Equation 2 and Equation 3, to be stored with a bit depth of N bit(s). Where N is a positive integer.

$$\text{clippedMV\_X} = \qquad\qquad\qquad\qquad\qquad\qquad [\text{Equation 2}]$$
$$\min(1 \ll (N-1) - 1, \max(-1 \ll (N-1), \text{MV\_X}))$$

$$\text{clippedMV\_Y} = \qquad\qquad\qquad\qquad\qquad\qquad [\text{Equation 3}]$$
$$\min(1 \ll (N-1) - 1, \max(-1 \ll (N-1), \text{MV\_Y}))$$

Where, MV_X is an X component of the motion vector, MV_Y is a Y component of the motion vector, min(a, b) is an operation outputting a small value of a and b, max(a, b) is an operation outputting a large value of a and b. clippedMV_X and clippedMV_Y are X and Y components of the clipped temporal motion vector, respectively, and are stored in the memory to be used as temporal motion vectors of the encoding/decoding target block.

For example, as shown in Table 1, when the size of the memory space is 48 bytes and a bit depth of 16 bits is used for each component of the motion vector, a total of 12 motion vectors may be stored.

TABLE 1

| MV1-X | MV1-Y | MV2-X | MV2-Y | MV3-X | MV3-Y | MV4-X | MV4-Y |
| MV5-X | MV5-Y | MV6-X | MV6-Y | MV7-X | MV7-Y | MV8-Y | MV8-Y |
| MV9-X | MV9-Y | MV10-X | MV10-Y | MV11-X | MV11-Y | MV12-X | MV12-Y |

However, when only a bit depth of 8 bits is used for each component of the motion vector, a total of 24 motion vectors may be stored as shown in Table 2.

TABLE 2

| MV1-X | MV1-Y | MV2-X | MV2-Y | MV3-X | MV3-Y | MV4-X | MV4-Y |
| MV5-X | MV5-Y | MV6-X | MV6-Y | MV7-X | MV7-Y | MV8-X | MV8-Y |
| MV9-X | MV9-Y | MV10-X | MV10-Y | MV11-X | MV11-Y | MV12-X | MV12-Y |
| MV13-X | MV13-Y | MV14-X | MV14-Y | MV15-X | MV15-Y | MV16-X | MV16-Y |
| MV17-X | MV17-Y | MV18-X | MV18-Y | MV19-X | MV19-Y | MV20-X | MV20-Y |
| MV21-X | MV21-Y | MV22-X | MV22-Y | MV23-X | MV23-Y | MV24-X | MV24-Y |

Accordingly, when an image reconstructed in an encoding apparatus and/or a decoding apparatus is stored in a decoded picture buffer (DPB) through an in-loop filtering process such as a deblocking filter or an adaptive loop filter, it is possible to save the motion vector of the reference picture by limiting a dynamic range of a motion vector. Here, the decoded picture buffer may mean the reference picture buffer of FIG. 1 or FIG. 2.

In addition, when the motion vector of the reference picture in the encoding apparatus and/or decoding apparatus is used for at least one of processes of using the motion vector of the reference picture, such as generation of the motion vector candidate list and generation of the merge candidate list, it is possible to limit the dynamic range of the motion vector of the reference picture. Herein, the limited dynamic range may be a range fixed to the encoding apparatus/decoding apparatus. For example, the fixed dynamic range may be N bit depth.

Meanwhile, in addition to the temporal motion vector, it is possible to limit the dynamic range of at least one of a spatial motion vector derived from an AMVP mode and a merge mode, a differential motion vector derived from the merge mode having a motion vector difference, a subblock motion vector derived from a subblock merge mode, a motion vector derived from a triangular division mode, an affine control point motion vector derived from an affine inter mode, and a corrected motion vector derived by correcting the motion information in the decoding apparatus itself. Herein, the limited dynamic range may be a range fixed to the encoding apparatus/decoding apparatus. For example, the fixed dynamic range may be N bit depth.

Further, in the present invention, at least one of one embodiment of the present invention may be applied to at least one of a block vector, a motion vector difference, and a block vector difference, instead of the motion vector. That is, at least one of the embodiments corresponding to the motion vector in the present invention may be equally applied to a block vector, a motion vector difference, and a block vector difference.

For example, at least one dynamic range of a block vector, a motion vector difference, and a block vector difference may be limited. Herein, the limited dynamic range may be a range fixed to the encoding apparatus/decoding apparatus. For example, the fixed dynamic range may be N bit depth. N may be a positive integer, for example 18.

When the bit depth N is 18, the limited dynamic range may be $-2^{17}$ to $2^{17}-1$, $-2^{17}$ may mean a minimum value of the dynamic range, and $2^{17}-1$ may mean a maximum value of the dynamic range.

The decoding apparatus 200 may automatically correct the derived motion information. The decoding apparatus 200 may search for a predefined region on the basis of the reference block indicated by the derived motion information to derive motion information having a minimum SAD as the corrected motion information.

I. Process of Clipping Motion Vector

A process of clipping each component of the motion vector may be performed when the slice type (slice_type) is not an I picture. The motion vector clipping process may be performed in units of treeblock or largest coding unit (LCU) after the filtering process is completed.

In the motion vector clipping process, inputs are the upper left pixel positions (xP, yP) of the prediction unit in the current picture and the motion vector matrices MvL0 and MvL1, and outputs are clipped motion vector matrices CMvL0 and CMvL1.

The operations of Equation 4 to Equation 7 may be performed on the matrices MvL0, MvL1, CMvL0, and CMvL1.

$$mvLX = MvLX[xP, yP] \quad \text{[Equation 4]}$$

$$cmvLX[0] = Clip3(-1 \ll (TMVBitWidth - 1), \quad \text{[Equation 5]}$$
$$1 \ll (TMVBitWidth - 1) - 1, mvLX[0])$$

$$cmvLX[1] = Clip3(-1 \ll (TMVBitWidth - 1), \quad \text{[Equation 6]}$$
$$1 \ll (TMVBitWidth - 1) - 1, mvLX[1])$$

$$CMvLX[xP, yP] = cmvLX \quad \text{[Equation 7]}$$

Here, TMVBitWidth represents a bit depth of a motion vector, Clip3(a, b, c) may mean a function that clips c in such a way to exist in a range between a and b.

II. Process of Storing Motion Vector

FIGS. 12 to 15 are flowcharts illustrating a method of storing a motion vector of a reference picture.

Figure 12:
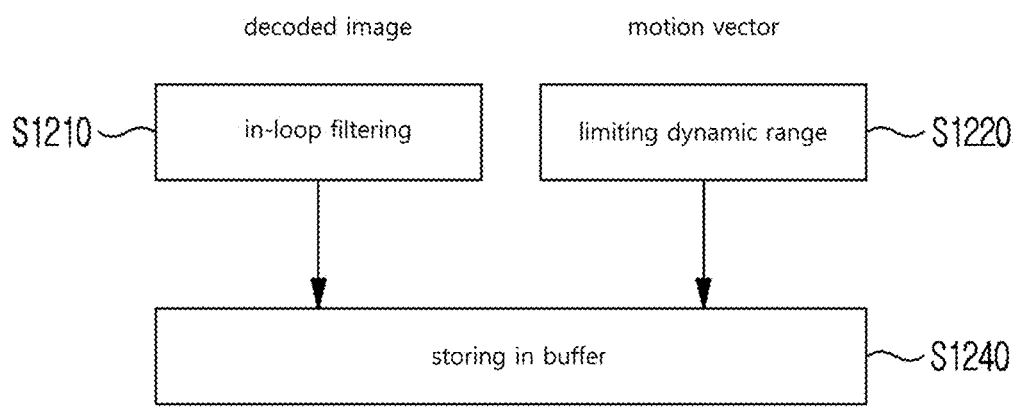
FIGS. 12 to 15 are flowcharts illustrating a method of storing a motion vector of a reference picture.

Referring to FIG. 12, a motion vector of a reference picture may be stored using an image buffer for storing a decoded picture and a motion vector buffer for storing a motion vector. Herein, the decoded picture may undergo an in-loop filtering process (S1210), and the motion vector undergoes a dynamic range limiting process (S1220) to be stored (S1240).

Figure 13:
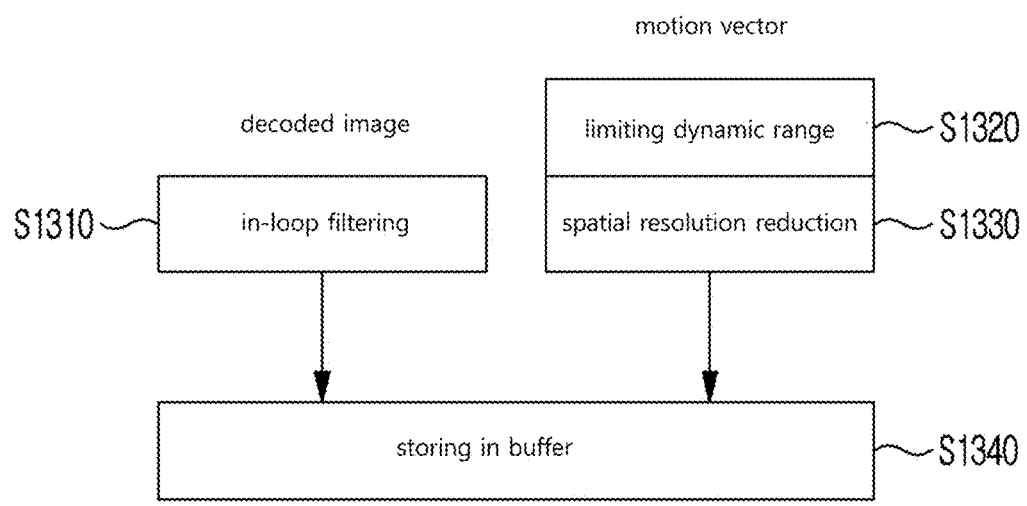

In addition, referring to FIG. 13, the image buffer and the motion vector buffer are used together, in which the motion vector may undergo a dynamic range limitation process (S1320) and a spatial resolution reduction process (S1330) to be stored (S1340).

Figure 14:
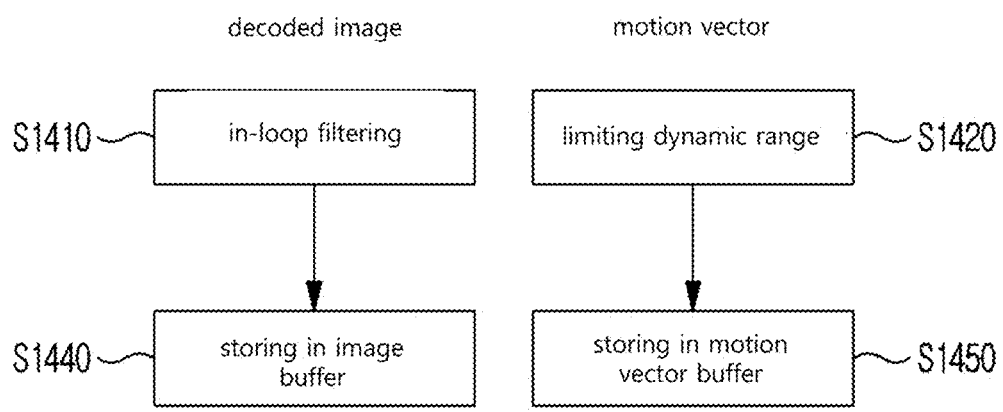

In addition, referring to FIG. 14, the decoded picture undergoes an in-loop filtering process (S1410) to be stored in the image buffer (S1440), and the motion vector undergoes a dynamic range limiting process (S1420) to be stored in the motion vector buffer (S1450).

Figure 15:
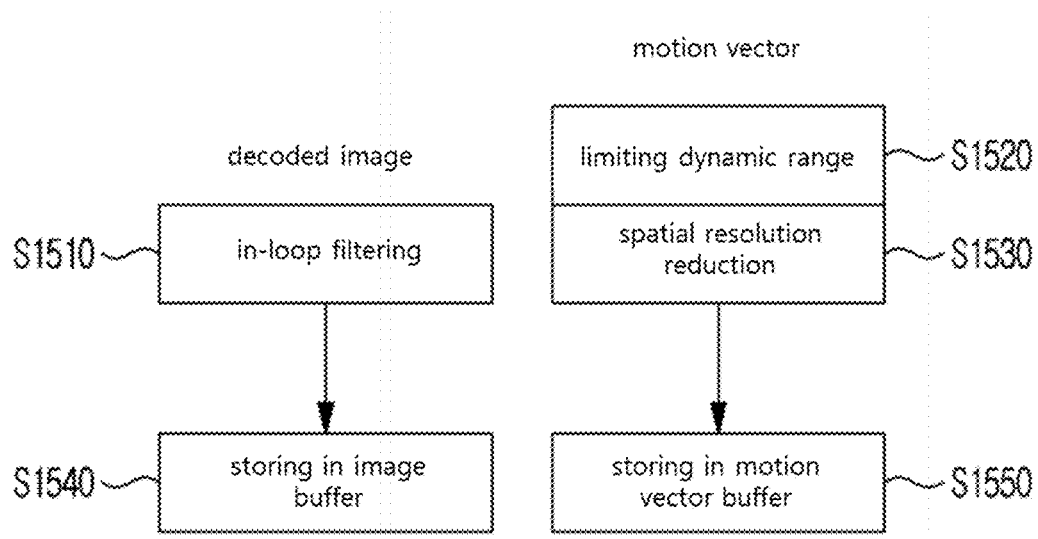

In addition, referring to FIG. 15, the decoded picture undergoes an in-loop filtering process (S1510) to be stored in the image buffer (S1540), and the motion vector undergoes a dynamic range limitation process (S1520) and a spatial resolution reduction process (S1530) to be stored (S1550).

Meanwhile, in the embodiments of FIGS. 13 and 15, the dynamic range limitation processes (S1320, S1520) and the spatial resolution reduction processes (S1330, S1530) are not limited to the order but may be changed.

In addition, it is possible to limit the dynamic range for each component of the motion vector differently, order to further reduce the memory access bandwidth. For example, it is possible to limit only one of the dynamic range of the X component and the dynamic range of the Y component, or it is possible to limit further the dynamic range of the Y component than the dynamic range of the X component.

Information indicating the limited dynamic range of the motion vector is set to a fixed value predetermined in the encoding apparatus and the decoding apparatus, or is transmitted through at least one of a sequence parameter set, a picture parameter set (PPS), a tile header, a slice header, a CTU, a block, and the like, and the decoding apparatus may perform the same restriction on the dynamic range of the temporal motion vector in at least one of the sequence, picture, tile, slice, CTU, and block. Herein, a bit depth, which is a size of a memory space required to store a motion vector expressed within a dynamic range, may be transmitted together. In addition, it is possible to efficiently store the temporal motion vector according to the motion characteristics of the image, by using a dynamic range transmitted through at least one of a sequence parameter, a picture parameter set, a slice header, a tile header, a CTU, a block, etc., without storing a motion vector using a fixed size bit depth. In the encoding apparatus or the decoding apparatus, a motion vector of a reference picture having a limited dynamic range may be used in at least one of processes of using a motion vector of a reference picture, such as generation of a motion vector candidate list and generation of a merge candidate list. The dynamic range may be represented by an N bit value. Where, N may be 0 or a positive integer.

Here, it is possible to have a different dynamic range in at least one unit of sequence, picture, slice, tile, CTU, and block.

For example, the first picture may have a dynamic range of 16 bits, and the second picture may have a dynamic range of 32 bits.

For example, the first tile in the picture may have a dynamic range of 16 bits, and the second tile in the picture may have a dynamic range of 32 bits.

For example, a first CTU in the picture may have a dynamic range of 16 bits, and a second CTU in a picture may have a dynamic range of 32 bits.

When at least one unit of a sequence, a picture, a slice, a tile, a CTU, and a block has different dynamic ranges from each other, information on the dynamic range in the corresponding unit may be entropy encoded/decoded.

Meanwhile, the motion vector may be quantized and stored. When the motion vector is quantized and stored, the precision of the motion vector is reduced. The quantization methods include uniform quantization in which a step size is equal, non-uniform quantization in which a step size is not equal, and the like. The step size of the quantization is set to a fixed value predetermined in the encoding apparatus and the decoding apparatus, or the information indicating the quantization step size is determined from the encoding apparatus to the decoding apparatus through at least one of a sequence parameter set, a picture parameter set, a tile header, a slice header, a CTU, a block, and the like. In the decoding apparatus, the quantized motion vector may be used as it is or in such a way to be dequantized.

Figure 16:
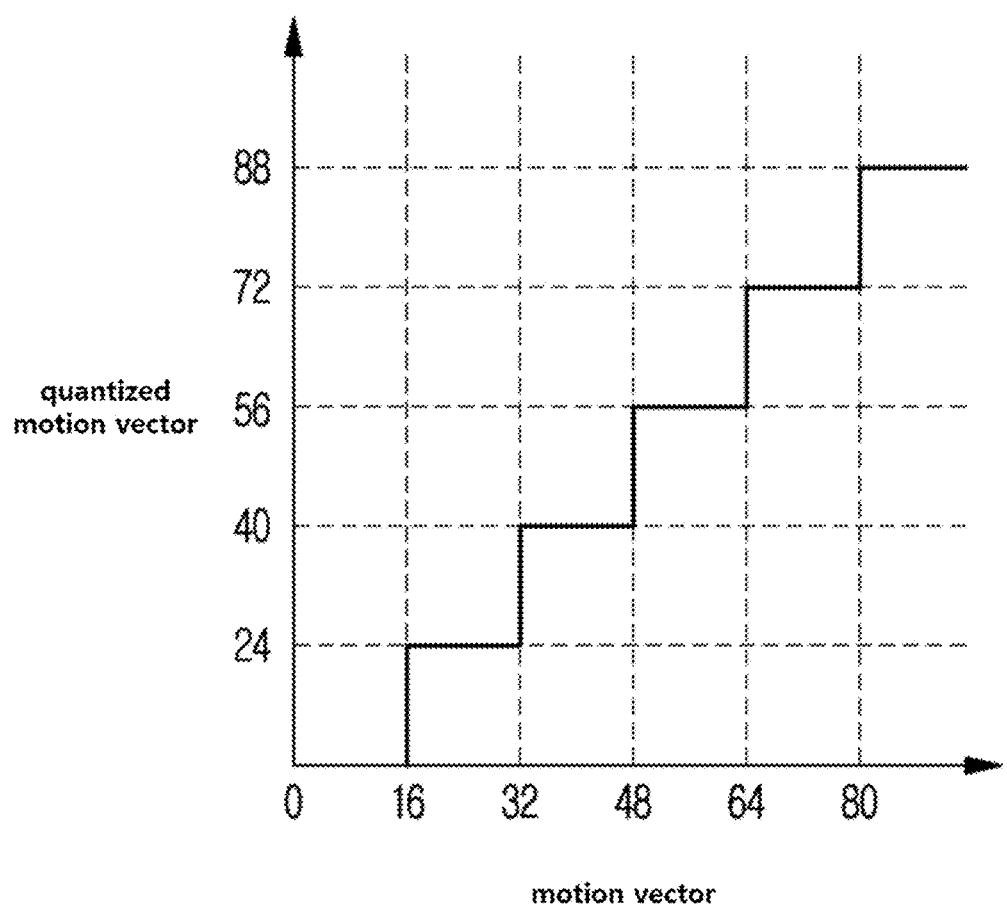
FIG. 16 is a diagram illustrating an example of quantizing a motion vector.

FIG. 16 is a diagram illustrating an example of quantizing a motion vector.

Referring to FIG. 16, when the motion vector has component values of 32 to 48, the motion vector is quantized to 40. In the encoding apparatus or the decoding apparatus, quantization is performed when storing the motion vector of the reference picture, and in at least one of processes of using a motion vector of the reference picture such as generating a motion vector candidate list and generating a merge candidate list, the motion vector of the quantized reference picture is dequantized and used. The step size may be represented by an N value. Here, N may be 0 or a positive integer.

Here, at least unit of sequence, picture, slice, tile, CTU, and block may have step sizes different from each other.

For example, the first picture may have a step size of one, and the second picture may have a step size of two.

For example, the first tile in the picture may have a step size of 1, and the second tile in the picture may have a step size of 2.

For example, a first CTU in the picture may have a step size of 1 and a second CTU in the picture may have a step size of 2.

When at least one unit among a sequence, a picture, a slice, a tile, a CTU, and a block has step sizes different from each other, information on the step size in the corresponding unit may be entropy encoded/decoded.

In addition, the motion vector may be stored with a limited representation resolution. The expression resolution may mean an integer pixel unit (1 pixel unit) or a fractional pixel unit (½ pixel unit, ¼ pixel unit, ⅛ pixel unit, 1/16 pixel unit, etc.).

For example, the resolution of a motion vector processed in a unit of ¼ pixel may be stored in an integer pixel. Information representing the representation resolution of the motion vector is set to a fixed value predetermined in the encoding apparatus and the decoding apparatus, or may be transmitted from the encoding apparatus to decoding apparatus through at least one of a sequence parameter set, a picture parameter set, a tile header, a slice header, a CTU, a block, and the like.

In the encoding apparatus or the decoding apparatus, the motion vector of the reference picture is store by limiting the representation resolution, and in at least one of the processes of using the motion vector of the reference picture, such as generating a motion vector candidate list and generating a merge candidate list, the motion vector of the reference picture with limited resolution may be reconstructed in the motion vector before the resolution is limited. For example, a motion vector in 1/16 pixel units may be stored at a limited resolution as a motion vector in ¼ pixel units, and the motion vector stored in 4/1 pixel units is reconstructed into 1/16 pixel units in at least one of processes using the motion vector of the reference picture. The representation resolution may be expressed as a value of M/N. Here, M and N may be 0 or a positive integer.

Here, at least one of a sequence, a picture, a slice, a tile, a CTU, and block may have representation resolutions different from each other.

For example, the first picture may have a representation resolution in 1/16 pixel units, and the second picture may have a representation resolution in ¼ pixel units.

For example, the first tile in the picture may have a representation resolution in 1/16 pixel units, and the second tile in the picture may have a representation resolution in ¼ pixel units.

For example, a first CTU in a picture may have a representation resolution in 1/16 pixel units, and a second CTU in a picture may have a representation resolution in ¼ pixel units.

When at least one unit of a sequence, a picture, a slice, a tile, a CTU, and a block has representation resolutions different from each other, information on the representation resolution in the corresponding unit may be entropy encoded/decoded.

Meanwhile, the motion vector may be stored by changing format thereof. Here, the format of the motion vector is a format representing a motion vector component, and may include a fixed point format, a floating point format, a signed n bits format, and the like.

For example, a motion vector component of a sign 18-bit format is changed into a motion vector component of a 6-bit mantissa and 4-bit exponent format by using a floating point format. That is, by changing the format of the motion vector component, the bit depth of the motion vector may be reduced from 18 bits to 10 bits.

More specifically, the encoding apparatus or the decoding apparatus may transform the motion vector value used in the inter prediction of the current block into a floating point format and then store the transformed value in a memory. The value transformed into floating point format may be transformed back to a motion vector value and then used for inter-prediction of neighboring blocks. In detail, the encoding apparatus or the decoding apparatus may transform a motion vector value expressed in N bits into an M-bit floating point format. In this case, the M bit may include R mantissa bits and P exponent portion bits. For example, N, M, R, and P may be positive integers, and may be 18, 10, 6, and 4, respectively.

For example, the motion vector used in the inter prediction of the current block may be transformed into a floating point format according to the following Equation 8.

$$s = mv[compIdx] \gg 17$$
$$f = \text{Floor}(\text{Log2}((mv[compIdx] \wedge s) | 31)) - 4$$
$$\text{mask} = (-1 \ll f) \gg 1$$
$$\text{round} = (1 \ll f) \gg 2$$
$$mv[compIdx] = (mv[compIdx] + \text{round}) \,\&\, \text{mask}$$

[Equation 8]

Here, mv[ ] may mean a motion vector value used in inter prediction of the current block, and compIdx may be a value indicating a component type of a motion vector. For example, compIdx may be an index value indicating an x value or a y value of a motion vector, an index value indicating a luminance or chrominance component of the motion vector, or an index value indicating a prediction direction (e.g., L0 or L1). Meanwhile, Floor( ) may be a function that discarding digits after the decimal point.

The format of the motion vector is set to a fixed format predetermined in the encoding apparatus and the decoding apparatus, or may be transmitted from the encoding apparatus to the decoding apparatus through at least one of a sequence parameter set, a picture parameter set, a tile header, a slice header, a CTU, a block, and the like.

In addition, at least one of a dynamic range limitation process, a spatial resolution reduction process, a quantization process, a representation resolution limiting process, and format change process of the motion vector are performed only on some motion vectors of the temporal motion vectors stored in the memory.

When storing the dynamic range of the motion vector by limiting the same, the dynamic range of the motion vector may be stored in the memory by adding the information thereon. For example, when the dynamic range of the motion vector is −128 to +127, a flag of 1 may be additionally stored, and when the dynamic range of the motion vector is set to −32 to +31, a flag of 0 may be additionally stored. Herein, the flag information may be stored together with the motion vector, or may be stored in a memory other than the memory in which the motion vector is stored. When the flag information and the motion vector are stored in memories different from each other, the flag information may be randomly accessed to find out which dynamic range a particular motion vector is stored in. In addition, information on which dynamic ranges some motion vector are stored in is transmitted through at least one of a sequence parameter set, a picture parameter set, a tile header, a CTU, a block, a slice header, and the like, thereby allowing the decoder to be performed similarly to the encoder.

When storing the spatial resolution of the motion vector by reducing the same, the spatial resolution of the motion vector may be stored in the memory by adding information thereon. For example, when a block size of the motion vector is 4×4, a flag of 1 may be additionally stored, and when a block size of the motion vector is 16×16, a flag of 0 may be additionally stored. Herein, the flag information may be stored together with the motion vector, or may be stored in a memory other than the memory in which the motion vector is stored. When the flag information and the motion vector are stored in memories different from each other, the flag information may be randomly accessed to find out which block size a particular motion vector is stored in. In addition, information on which block size some motion vectors are stored in is transmitted through at least one of a sequence parameter set, a picture parameter set, a tile header, a CTU, a block, a slice header, and the like, thereby allowing the decoder to be performed similarly to the encoder.

When quantizing and then storing the motion vector, the resolution of the motion vector may be stored in the memory by adding information thereon. For example, when a step size of the motion vector is 4, a flag of 1 may be additionally stored, and when a step of size of the motion vector is 1, a flag of 0 may be additionally stored. Herein, the flag information may be stored together with the motion vector, or may be stored in a memory other than the memory in which the motion vector is stored. When the flag information and the motion vector are stored in memories different from each other, the flag information may be randomly accessed to find out which step size a particular motion vector is stored in. In addition, information on which step size some motion vectors are stored in is transmitted through at least one of a sequence parameter set, a picture parameter set, a tile header, a CTU, a block, a slice header, and the like, thereby allowing the decoder to be performed similarly to the encoder.

When storing the representation resolution of the motion vector by limiting the same, the representation resolution of the motion vector may be stored in the memory by adding the information thereon. For example, when the representation resolution is in integer units, a flag of 1 may be additionally stored, and when the representation resolution is in 4/1 pixel units, a flag of 0 may be additionally stored. Herein, the flag information may be stored together with the motion vector, or may be stored in a memory other than the memory in which the motion vector is stored. When the flag information and the motion vector are stored in memories different from each other, the flag information may be randomly accessed to find out which representation resolution a particular motion vector is stored in. In addition, information on which representation resolution some motion vector are stored in is transmitted through at least one of a sequence parameter set, a picture parameter set, a tile header, a CTU, a block, a slice header, and the like, thereby allowing the decoder to be performed similarly to the encoder.

In addition, when storing the motion information in the memory, the motion information may be stored by reducing the spatial resolution of the motion vector. In this case, the motion information may include at least one or more pieces of inter prediction mode information indicating a reference picture index, a motion vector, a uni-direction or a bi-direction, etc., that are required for inter prediction, a reference picture list, prediction mode information regarding whether to be coded in an intra prediction mode or whether to be coded in an inter prediction mode.

For example, the motion information of the prediction unit having the largest partition or block size among a plurality of pieces of motion information of a specific region may be stored in memory as representative motion information. In this case, the specific region may include the region within the encoding/decoding target block and the region of the neighboring block. In addition, the specific region may be a region including a block in which motion information is stored when the entire picture or slice is divided by a predetermined size.

For example, it is possible to store the representative motion information in a memory after excluding motion information encoded by a motion information merge method, a coded information skip method, and the like among a plurality of pieces of motion information included in a specific region.

For example, the most frequently occurring motion information among a plurality of pieces of motion information included in a specific region may be stored in a memory as the representative motion information. Herein, the number of occurrences of motion information may be calculated for each block size.

For example, it is possible to store the motion information of a specific position among a plurality of pieces of motion information included in a specific region. Herein, the specific position may be a position included in the specific region and may be a fixed position of the specific region. In addition, the specific position may be selected as one of a plurality positions. When a plurality of positions is used, priority may be determined for each position, and motion information may be stored in a memory according to the priority. In addition, according to the priority of each position, whether the motion information exists in the corresponding position may be checked, and when the motion vector exists, the motion information of the corresponding position may be stored.

For example, when storing a plurality of pieces of motion information included in a specific region in a memory, there is no motion information outside a boundary of slice or picture, a block encoded in the intra prediction mode, a block coded in the pulse coded modulation (PCM) mode, the motion information of the corresponding position may not be stored in the memory.

For example, when storing motion information at a specific position, itis possible to store a statistical value, such as a median or an average of motion information of inter prediction coded blocks around the corresponding position, in a memory.

When storing the motion information of a specific position in the above examples, when the motion information of the corresponding position does not exist, the motion information of the collocated block, the motion information of the first coded block, or the motion information of the neighboring block may be used as motion information of the corresponding position. Herein, the specific position may be one sample position or a block position in the block around the encoding/decoding target block. For example, when motion information of a specific position does not exist, a statistical value such as a median or average value of motion information of inter prediction coded blocks around the position may be stored in a memory. For example, when motion information of a specific position does not exist, an average value of motion information of neighboring blocks of the corresponding position may be stored in a memory. When calculating the median value and the average value, when the motion information of neighboring blocks differs from one or more of reference picture index, reference picture list, and inter prediction mode information, the motion vector may be adjusted in size according to reference picture index, a reference picture list, inter prediction mode information, a picture display count, and the like.

III. Process of Deriving Motion Vector

When storing the motion information in the memory using the above-described motion information methods, and using the motion information of the reference picture in the motion vector prediction method, advanced motion vector prediction method, or motion information merge method, the stored motion information may be obtained.

For example, motion information of a position corresponding to the position of the encoding/decoding target block in the reference picture may be obtained. In this case, a position corresponding to the position of the encoding/decoding target block in the reference picture may be a fixed position in a specific region or a relative position to the position of the encoding/decoding target block.

FIGS. 17 to 20 are diagrams illustrating an example of obtaining motion information from a reference picture.

In FIGS. 17 to 20, block X represents an encoding/decoding target block in an encoding/decoding target pictures 1710, 1810, 1910, and 2010, and block A, block B, block C, block D, and block E represent reconstructed blocks located around the encoding/decoding target block.

A block T in the reference picture 1720, 1820, 1920, and 2020 indicates a collocated block corresponding to the encoding/decoding target block.

Figure 20:
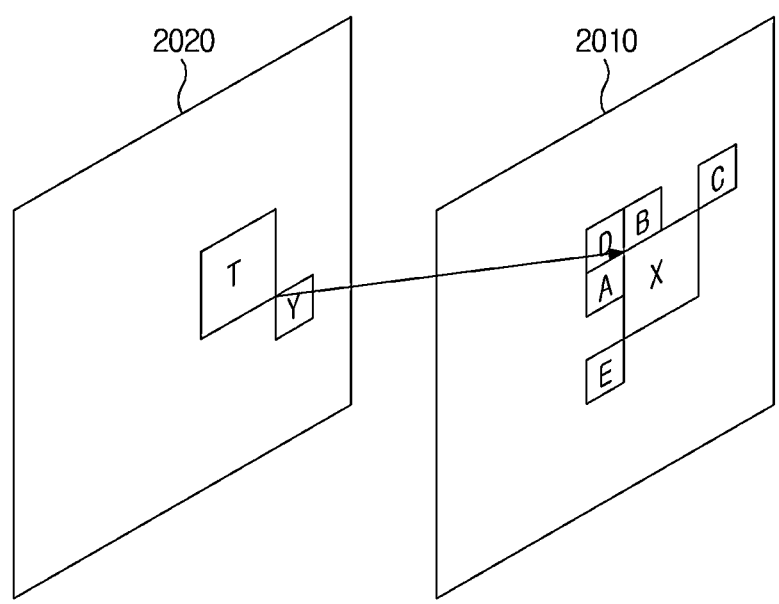

A block Y in the reference picture 2020 of FIG. 20 indicates a block corresponding to a position other than the encoding/decoding target block.

Figure 17:
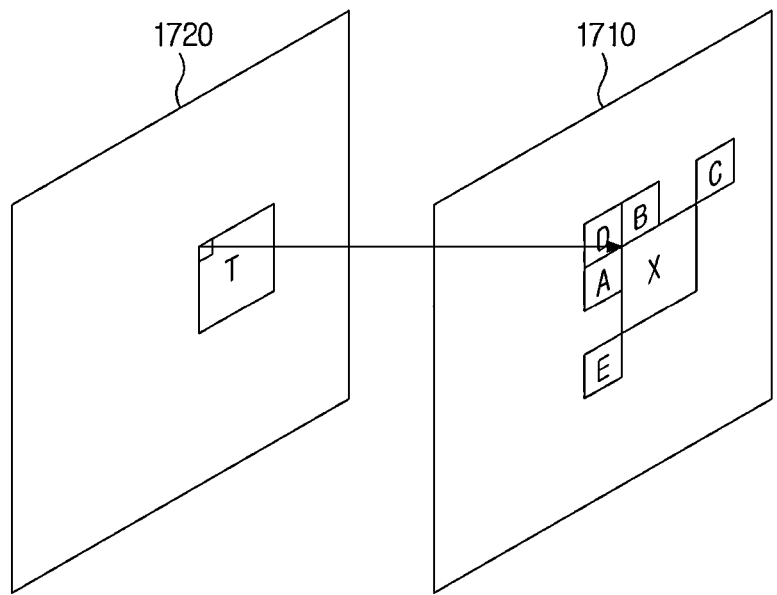
FIGS. 17 to 20 are diagrams illustrating an example of obtaining motion information from a reference picture.

Referring to FIG. 17, it is possible to obtain the motion information in a position corresponding to an upper left pixel position in the reference picture among positions of the encoding/decoding target block X.

Figure 18:
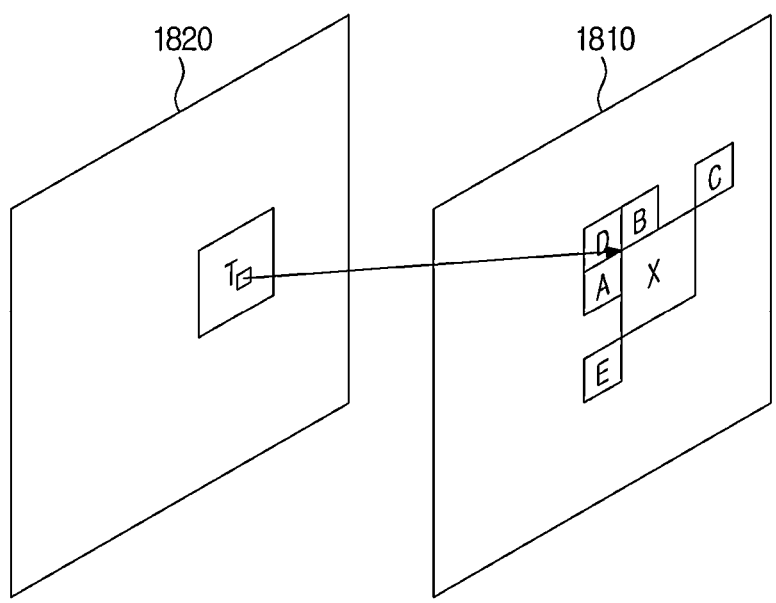

Referring to FIG. 18, it is possible to obtain the motion information in a position corresponding to a center pixel position in the reference picture among positions of the encoding/decoding target block X.

Figure 19:
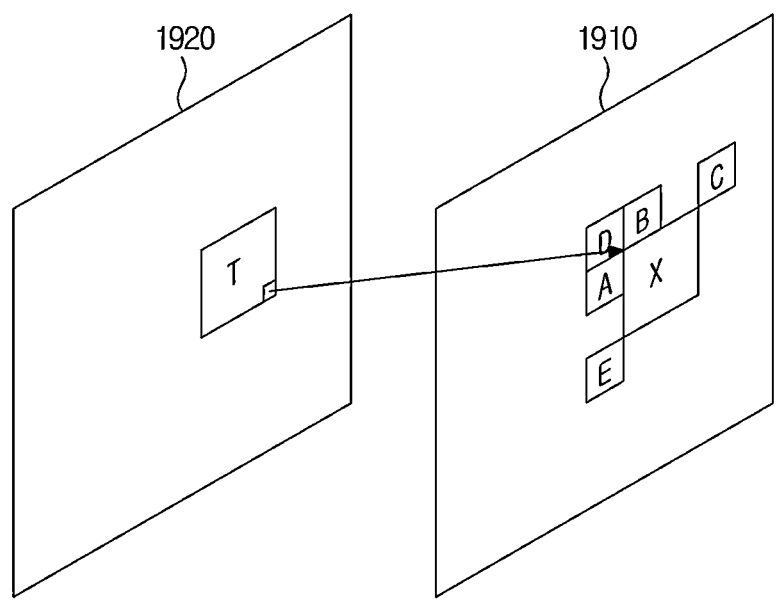

Referring to FIG. 19, it is possible to obtain the motion information in a position corresponding to an upper right pixel position in the reference picture among positions of the encoding/decoding target block X.

Referring to FIG. 20, it is possible to obtain motion information in a position corresponding to a position other than the encoding/decoding target block X in the reference picture.

By using motion information stored in the memory, i.e., motion information of a reference picture, encoding/decoding methods such as motion vector prediction, advanced motion vector prediction, motion information merge, and motion information merge skip may be performed.

The motion vector is stored in memory using at least one of a method of limiting the dynamic range of the motion vector, a method of reducing the spatial resolution of the motion vector, a method of quantizing the motion vector, a method of reducing the resolution of the representation of the motion vector, and a method of changing the motion vector format, and the stored motion vector may be used for motion vector prediction and motion information merge of the encoding/decoding target block.

A process of obtaining a motion vector of a reference picture from memory may be referred to as a process of deriving a temporal motion vector. In the process of deriving temporal motion vectors, TMVbitWidth represents a bit width of temporal motion vectors stored in memory.

In the process of deriving the temporal motion vector, inputs are (xP, yP), which is an upper left pixel position of the prediction unit in the current picture, nPSW and nPSH, which are horizontal and vertical lengths of the luminance prediction unit, and refIdsLX, which is a reference picture index of the current prediction unit partition, and outputs are mxLXCl which is a motion vector prediction value and the availableFlagLXCol which is a flag indicating the presence.

RefPicOrderCnt (pic, refidx, LX) is a function of outputting PicOrderCnt of the reference picture RefPicListX [refidx] of pic. Where, X is 0 or 1. The PicOrderCnt of the reference picture exists until the picture is treated as "nonexisting". Clip3 (a, b, c) means a function of clipping c so that it is within a range between a and b.

ColPic having a collocated partition becomes RefPicList1[0] when the slice type (slice_type) is B-slice and collocated_from_10_flag is 0; and RefPicList0[0] when slice type is P-slice or collocated_from_10_flag is 1.

ColPu and (xPCol, yPCol) which is a position of colPu is derived in the following order.

1. The lower right luminance component position (xPRb, yPRb) of the current prediction unit is defined as Equation 9 and Equation 10.

$$xPRb = xP + nPSW \qquad \text{[Equation 9]}$$

$$yPRb = yP + nPSH \qquad \text{[Equation 10]}$$

2. When colPu is encoded in intra prediction mode or colPu does not exist,
   (1) The central luminance component position (xPCtr, yPCtr) of the current prediction unit is defined as Equation 11 and Equation 12.

$$xPCtr = (xP + (nPSW \gg 1)) - 1 \qquad \text{[Equation 11]}$$

$$yPCtr = (yP + (nPSH \gg 1)) - 1 \qquad \text{[Equation 12]}$$

(2) colPu is set in a prediction unit containing the position of ((xPCtr>>4)<<4, (yPCtr>>4)<<4) in colPic.
3. (xPCol, yPCol) becomes a value of the upper left luminance component position of colPu from the upper left luminance component position of colPic.

mvLXCol and availableFlagLXCol are derived as follows.

1. When colPu is coded in intra prediction mode or colPu does not exist, each component of mvLXCol is 0, and availableFlagLXCol is also 0.
2. Otherwise, when colPu is not encoded in the intra prediction mode, and colPu exists, mvLXCol and refIdxCol are derived as follows.
   (1) When PredFlagL0[xPCol][yPCol] is 0, the motion vector mvCol is determined as MvL1 [xPCol] [yPCol], and the reference picture index refIdxCol is determined as RefIdxL1 [xPCol] [yPCol].
   (2) Otherwise, when PredFlagL0 [xPCol] [yPCol] is 1, the following process is performed.
   1) When PredFlagL1 [xPCol] [yPCol] is 0, the motion vector mvCol is determined as MvL0 [xPCol] [yPCol], and the reference picture index refIdxCol is determined as RefIdxL0 [xPCol] [yPCol].
   2) Otherwise, that is, if PredFlagL1 [xPCol] [yPCol] is 1, the following process is performed.
   a. X becomes 0 or 1, and the following alposition process is performed.
   i. RefIdxColLX is assigned to RefIdxLX [xPCol] [yPCol].
   ii. When PicOrderCnt(colPic) is less than PicOrderCnt(currPic), and RefPicOrderCnt(colPic, RefIdxColLX, LX) is greater than PicOrderCnt(currPic), or when PicOrderCnt(colPic) is greater than PicOrderCnt(currPic), and RefPicOrderCnt(colPic, RefIdxColLX, LX) is less than PicOrderCnt(currPic), MvXCross is assigned to 1.
   iii. Otherwise, when PicOrderCnt(colPic) is less than PicOrderCnt(currPic), and RefPicOrderCnt(colPic, RefIdxColLX, LX) is less than PicOrderCnt(currPic), or when PicOrderCnt(colPic) is greater than PicOrderCnt(currPic), and RefPicOrderCnt(colPic, RefIdxColLX, LX) is greater than PicOrderCnt(currPic), MvXCross is assigned to 1.
   b. When one of the following conditions is satisfied, motion vector mvCol, reference picture index refIdxCol, and ListCol are determined as MvL1 [xPCol] [yPCol], RefIdxColL1, and L1, respectively.
   i. Mv0Cross is 0, Mv1Cross is 1.
   ii. Mv0Cross is the same as Mv1Cross, reference picture list is L1.
   c. Otherwise, the motion vector mvCol, the reference picture index refIdxCol, and ListCol are determined as MvL0 [xPCol] [yPCol], RefIdxColL0, and L0, respectively.
3) availableFlagLXCol is 1, operations of Equation 13 or Equation 14 to Equation 19 are performed.
   a. When PicOrderCnt(colPic)-RefPicOrderCnt(colPic, refIdxCol, ListCol) is the same as PicOrderCnt(currPic)-RefPicOrderCnt(currPic, refIdxLX, LX), $$mvLXCol = \text{Clip3}\binom{-1 \ll (TMVBitWidth - 1),}{1 \ll (TMVBitWidth - 1) - 1, mvCol} \qquad \text{[Equation 13]}$$

b. Otherwise, $$tx = (16384 + \text{Abs}(td/2))/td \qquad \text{[Equation 14]}$$

$$DistScaleFactor = \text{Clip3}(-1024, 1023, (tb*tx + 32) \gg 6) \qquad \text{[Equation 15]}$$

$$mvLXCol' = \text{Clip3}\binom{-1 \ll (TMVBitWidth - 1),}{1 \ll (TMVBitWidth - 1) - 1, mvCol} \qquad \text{[Equation 16]}$$

$$mvLXCol = \qquad \text{[Equation 17]}$$
$$ClipMv((DistScaleFactor*mvLXCol' + 128) \gg 8)$$

Herein, td and tb are as in Equation 18 and Equation 19.

$$td = \text{Clip3}\binom{-128, 127, PicOrderCnt(colPic) -}{RefPicOrderCnt(colPic, refIdxCol, ListCol)} \qquad \text{[Equation 18]}$$

$$tb = \text{Clip3}\binom{-128, 127, PicOrderCnt(currPic) -}{RefPicOrderCnt(currPic, refIdxLX, LX)} \qquad \text{[Equation 19]}$$

That is, referring to Equation 14 to Equation 17, mvLXCol is derived into a scaled version of the motion vector mvCol.

Meanwhile, even if the motion vector is clipped in the dynamic range, when the clipped motion vector is scaled, the motion vector may be out of the dynamic range again. Therefore, after deriving the scaled motion vector, it is possible to limit a dynamic range of the motion vector. Herein, Equation 16 and Equation 17 may be replaced with Equation 20 and Equation 21, respectively.

$$mvLXCol' = \qquad \text{[Equation 20]}$$
$$ClipMv((DistScaleFactor*mvLXCol + 128) \gg 8)$$

$$mvLXCol = \text{Clip3}\binom{-1 \ll (TMVBitWidth - 1),}{1 \ll (TMVBitWidth - 1) - 1, mvCol'} \qquad \text{[Equation 21]}$$

Meanwhile, the motion vector obtained from the collocated block in the reference picture may be changed in format and then derived into a temporal motion vector.

For example, a temporal motion vector may be derived by changing a motion vector component of a 6-bit mantissa and 4-bit exponent format into a motion vector component of a sign 18-bit format. That is, by changing the format of the motion vector component, the bit depth of the motion vector may be increased from 10 bits to 18 bits.

For example, TMVBitWidth used to limit the dynamic range of the scaled motion vector may be fixed to M bits and applied to an encoding apparatus/decoding apparatus. Here, M may be a positive integer, for example 18.

In detail, when the scaled motion vector value stored in the memory is not included within a predetermined range, the encoding apparatus or the decoding apparatus may determine the scaled motion vector value of the current block as the minimum or maximum value of the predetermined range, to use the same in inter prediction of the current block. Specifically, when the scaled motion vector value stored in the memory is smaller than the minimum value of the predetermined range, the encoding apparatus or the decoding apparatus may determine the scaled motion vector value as the minimum value of the predetermined range and use the same for the inter prediction of the current block. In addition, when the scaled motion vector value is larger than the maximum value of the predetermined range, the encoding apparatus or the decoding apparatus may determine the scaled motion vector value as the maximum value of the predetermined range and use the same for the inter prediction. In addition, when the scaling motion vector value of the current block is not included in the predetermined range, the encoding apparatus or the decoding apparatus may determine the scaled motion vector value as the minimum or maximum value of the predetermined range and store the determined value in the memory. For example, the predetermined range may be $-2^N$ to $2^N-1$. Here, N may be a positive integer, for example 17. When N is 17, $-2^N$ may have a value of $-131072$, and $2^N-1$ may have a value of $131071$.

In the encoder and the decoder, a format of a motion vector taken from a collocated block in a reference picture is changed to derive a temporal motion vector having a changed format. In this case, the bit depth of the temporal motion vector in which format is changed may be higher as compared with the bit depth of the temporal motion vector before the format is changed.

The scaled motion vector may be derived by performing scaling on the temporal motion vector changed in format.

The final temporal motion vector may be derived by limiting the dynamic range for the scaled motion vector. Herein, a clipping process may be performed when limiting the dynamic range.

The scaling process and the clipping process may be sequentially performed as two processes, and may be performed as one integrated process.

The final temporal motion vector may be changed in format again and used as a motion vector for the reference picture. Herein, the bit depth of the temporal motion vector in which format is changed may be lower as compared to the bit depth of the temporal motion vector before the format is changed.

IV. Method of Transmitting Information for Clipping Temporal Motion Vector in Decoding Apparatus Hereinafter, a method of transmitting information necessary for clipping a temporal motion vector in the decoding apparatus in the same manner as the encoding apparatus will be described.

TMVBitWidth in the above-described temporal motion vector derivation process may be transmitted from the encoding apparatus to the decoding apparatus through at least one of a sequence parameter set, a picture parameter set, a slice header, a tile header, a CTU, a block, and the like.

bit_width_temporal_motion_vector_minus8 of FIG. 21 indicates a bit width of a temporal motion vector component. When bit_width_temporal_motion_vector_minus8 does not exist, it is inferred to be 0, and the bit width of the temporal motion vector component may be expressed as Equation 22.

$$TMVBitWidth = \text{bit\_width\_temporal\_motion\_vector\_minus8} + 8 \qquad \text{[Equation 22]}$$

1. First Information Transmission Method (when Compressing a Motion Vector and Limiting the Bit Depth of the Motion Vector)

Referring to FIG. 22, when motion_vector_buffer_comp_flag is 1, a motion vector buffer compression process may be performed.

motion_vector_buffer_comp_ratio_log 2 represents a compression ratio of the motion vector buffer compression process. When motion_vector_buffer_comp_ratio_log 2 does not exist, it is inferred to be 0, and the motion vector buffer compression ratio may be expressed as Equation 23.

$$MVBufferCompRatio = 1 \ll \text{motion\_vector\_buffer\_comp\_ratio\_log2} \qquad \text{[Equation 23]}$$

Referring to FIG. 22, when bit_depth_temporal_motion_vector_constraint_flag is 1, a temporal motion vector bit depth limiting process may be performed.

bit_depth_temporal_motion_vector_minus8 represents a bit depth of the temporal motion vector. When bit_depth_temporal_motion_vector_minus8 does not exist, it is inferred to be 0, and the bit depth of the temporal motion vector may be expressed as Equation 24.

$$TMVBitDepth = \text{bit\_depth\_temporal\_motion\_vector\_minus8} + 8 \qquad \text{[Equation 24]}$$

Second Information Transmission Method (when Limiting a Bit Depth of the Motion Vector)

Referring to FIG. 23, when bit_depth_temporal_motion_vector_constraint_flag is 1, the temporal motion vector bit depth restriction process may be performed.

Bit_depth_temporal_motion_vector_minus8 represents a bit depth of the temporal motion vector. When bit_depth_temporal_motion_vector_minus8 does not exist, it is inferred to be 0, and the bit depth of the temporal motion vector may be expressed as Equation 25.

$$TMVBitDepth = \text{bit\_depth\_temporal\_motion\_vector\_minus8} + 8 \qquad \text{[Equation 25]}$$

3. Third Information Transmission Method (when Limiting a Bit Depth of the Motion Vector)

bit_depth_temporal_motion_vector_minus8 of FIG. 24 represents a bit depth of a temporal motion vector. When bit_depth_temporal_motion_vector_minus8 does not exist, it is inferred to be 0, and the bit depth of the temporal motion vector may be expressed as Equation 26.

$$TMVBitDepth = \text{bit\_depth\_temporal\_motion\_vector\_minus8} + 8 \quad \text{[Equation 26]}$$

4. Fourth Information Transmission Method (when Limiting a Bit Depth for Each of X and Y Components of the Motion Vector)

Referring to FIG. 25, when bit_depth_temporal_motion_vector_constraint_flag is 1, the temporal motion vector bit depth restriction process may be performed.

bit_depth_temporal_motion_vector_x_minus8 represents a bit depth of the X component of the temporal motion vector. When bit_depth_temporal_motion_vector_x_minus8 does not exist, it is inferred to be 0, and the bit depth of the temporal motion vector may be expressed as Equation 27.

$$TMVXBitDepth = \text{bit\_depth\_temporal\_motion\_vector\_x\_minus8} + 8 \quad \text{[Equation 27]}$$

bit_depth_temporal_motion_vector_y_minus8 represents a bit depth of the Y component of the temporal motion vector. When bit_depth_temporal_motion_vector_x_minus8 does not exist, it is inferred to be 0, and the bit depth of the temporal motion vector may be expressed as Equation 28.

$$TMVXBitDepth = \text{bit\_depth\_temporal\_motion\_vector\_y\_minus8} + 8 \quad \text{[Equation 28]}$$

5. Fifth Information Transmission Method (when Compressing the Motion Vector and Limiting a Bit Depth of the Motion Vector)

Referring to FIG. 26, when motion_vector_buffer_comp_flag is 1, a motion vector buffer compression process may be performed.

motion_vector_buffer_comp_ratio_log 2 represents a compression ratio of the motion vector buffer compression process. When motion_vector_buffer_comp_ratio_log 2 does not exist, it is inferred to be 0, and the motion vector buffer compression ratio may be expressed as Equation 29.

$$MVBufferCompRatio = 1 \ll \text{motion\_vector\_buffer\_comp\_ratio\_log2} \quad \text{[Equation 29]}$$

V. Definition of Dynamic Range Via Level of Image Codec

The dynamic range of the temporal motion vector may not be transmitted through at least one of a sequence parameter set, a picture parameter set, a slice header, a tile header, a CTU, a block, and the like, and may be defined through a level of an image codec. The encoding apparatus and the decoding apparatus may determine the limited dynamic range of the motion vector using the level information.

In addition, the dynamic range and/or bit depth of each of the X and Y components of the motion vector may be defined differently in level, and the minimum and maximum values of the respective components may be defined.

FIG. 27 is an example of defining TMVBitWidth at a level in the above-described temporal motion vector derivation process.

Referring to FIG. 27, TMVBitWidth may be set to MaxTMVBitWidth defined at a level. Herein, MaxTMVBitWidth represents the maximum bit width of the motion vector when the temporal motion vector is stored in the memory.

Meanwhile, TMVBitWidth may be defined at a level, and it is possible to transmit a delta value of the defined values through at least one of a sequence parameter set, a picture parameter set, a slice header, a tile header, a CTU, a block, and the like. That is, TMVBitWidth may be set to a value obtained by adding the delta value transmitted by at least one of a sequence parameter set, a picture parameter set, a slice header, a tile header, a CTU, a block, etc. to MaxTMVBitWidth defined at a level. Herein, TMVBitWidth represents a bit width of the motion vector when the temporal motion vector is stored in the memory.

FIG. 28 is an example of defining TMVBitDepth at a level in the above-described temporal motion vector derivation process.

Referring to FIG. 28, TMVBitDepth may be set to MaxTMVBitDepth defined at a level. Herein, MaxTMVBitDepth represents the maximum bit depth of the motion vector when the temporal motion vector is stored in the memory.

Meanwhile, TMVBitDepth is defined at a level, and it is possible to transmit a delta value of the defined value through at least one of a sequence parameter set, a picture parameter set, a slice header, a tile header, a CTU, a block, and the like. That is, TMVBitDepth may be set to a value obtained by adding the delta value transmitted by at least one of a sequence parameter set, a picture parameter set, a slice header, a tile header, a CTU, a block, etc. to MaxTMVBitDepth defined at a level. In this case, TMVBitDepth represents a bit depth of the motion vector when the temporal motion vector is stored in the memory.

delta_bit_width_temporal_motion_vector_minus8 of FIG. 29 represents a difference in bit widths of temporal motion vector components. When delta_bit_width_temporal_motion_vector_minus8 does not exist, it is inferred to be 0, and a bit width of the temporal motion vector component may be expressed as Equation 30.

$$TMVBitWidth = \text{delta\_bit\_width\_temporal\_motion\_vector\_minus8} + \text{Max}TMVBitWidth \quad \text{[Equation 30]}$$

In addition, a dynamic range of each component of the temporal motion vector may be defined at a level as shown in FIG. 30.

In addition, as shown in FIGS. 31 to 33, a bit width of each component of the temporal motion vector may be defined at a level.

In addition, a bit width of the Y component of the temporal motion vector may be defined at a level as shown in FIG. 34.

In addition, the dynamic range of the temporal motion vector may be defined as a fixed value predetermined promised in the encoding apparatus and the decoding apparatus without transmission of information on the limitation of the motion vector, or may be stored in the form of a fixed bit depth.

When TMVBitWidth is fixed to the same value in the encoding apparatus and the decoding apparatus, TMVBitWidth may be a positive integer such as 4, 6, 8, 10, 12, 14, 16, or the like. Herein, TMVBitWidth represents a bit width of the motion vector when the temporal motion vector is stored in the memory.

Figure 35:
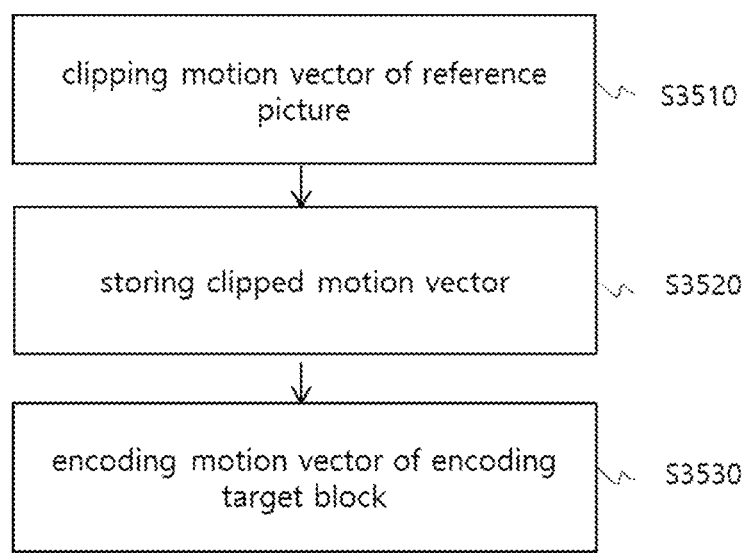
FIG. 35 is a flowchart illustrating a method of encoding an image using motion vector clipping according to an embodiment of the present invention.

FIG. 35 is a flowchart illustrating a method of encoding an image using motion vector clipping according to an embodiment of the present invention. Referring to FIG. 35, the image encoding method includes a clipping step S3510, a storing step S3520, and an encoding step S3530.

The image encoding apparatus and/or the decoding apparatus clips the motion vector of the reference picture in a predetermined dynamic range (S3510). As described in "I. Process of clipping motion vector", the motion vector outside the dynamic range may be expressed as the minimum value or the maximum value of the dynamic range. Therefore, as described in "IV. Method of transmitting information for clipping temporal motion vector in decoding apparatus" and "V. Definition of dynamic range via level of image codec", the motion vector of the reference picture may be clipped to a predetermined dynamic range, by limiting the bit depth through a level of an image codec and/or a set of sequence parameters, or by limiting the dynamic range through a level of an image codec.

The image encoding apparatus and/or the decoding apparatus store the motion vector of the clipped reference picture in a buffer as described in the "II. Motion vector storage process" (S3520). The motion vector may be stored in a buffer together with the decoded picture or separately.

The image encoding apparatus encodes the motion vector of the encoding target block by using the stored motion vector of the reference picture (S3530). As described in "III. Process of deriving motion vector, the advanced motion vector prediction method may use not only the motion vector of the reconstructed block located in the spatial vicinity of the encoding/decoding target block, but also motion vector of the block present in the same position to or the corresponding position as the encoding/decoding target block within the reference picture. A motion vector of blocks existing at the same position or corresponding position may be used. Accordingly, the motion vector of the encoding target block may be not only a motion vector of a neighboring block adjacent to the encoding target block, but also a motion vector of a reference picture, that is, a temporal motion vector.

Meanwhile, since the dynamic range of the X component and the dynamic range of the Y component of the motion vector of the reference picture may be defined differently from each other, each component of the motion vector of the reference picture may be clipped to the dynamic range.

In addition, it is possible to use a method of limiting the dynamic range of the motion vector of the reference picture, as well as a method of compressing the motion vector of the reference picture. Here, the compression of the motion vector may mean a format change of the motion vector described above.

When limiting a dynamic range of a motion vector of a reference picture or compressing a motion vector of a reference picture, a flag indicating the level and/or a sequence parameter set of an image codec and the like may be defined.

In addition, by using motion information stored in the memory, that is, motion information of the reference picture, encoding methods such as motion vector prediction, advanced motion vector prediction, motion information merge, motion information merge skip, etc. may be performed.

Figures 36, 37, 38:
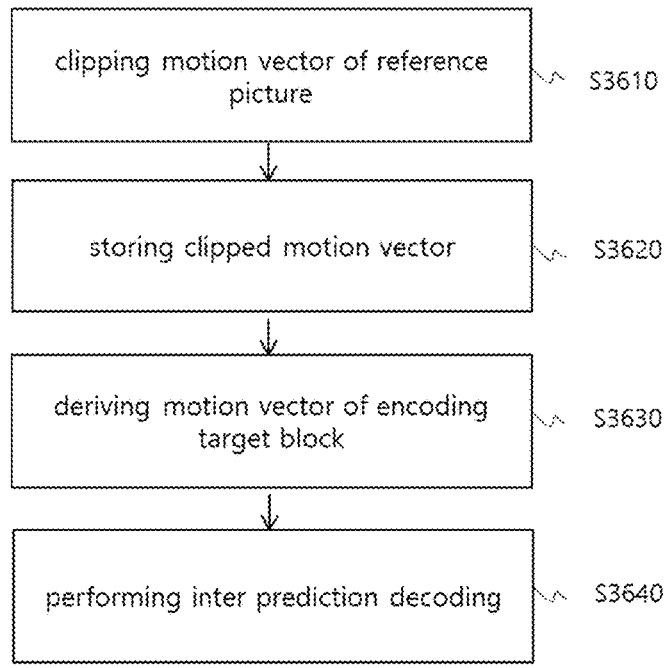
FIG. 36 is a flowchart illustrating a method of decoding an image using motion vector clipping according to an embodiment of the present invention.
FIG. 37 is a diagram illustrating a motion information storage indicator.
FIG. 38 is a diagram illustrating collocated direction information and collocated picture index.

FIG. 36 is a flowchart illustrating a method of decoding an image using motion vector clipping according to an embodiment of the present invention.

Referring to FIG. 36, the image decoding method includes a clipping step S3610, a storing step S3620, a deriving step S3630, and a decoding step S3640.

The clipping step S3610 and the storing step S3620 of FIG. 36 are similar to the clipping step S3510 and the storing step S3520 of FIG. 35 using the aforementioned "I. Process of clipping motion vector" and "II. Process of storing motion vector". In addition, the derivation step S3630 of FIG. 36 uses the aforementioned "III. Process of deriving motion vector" and is symmetrical to the encoding step S3530 of FIG. 35. Therefore, detailed description thereof will be omitted.

The image decoding apparatus performs inter prediction decoding using the motion vector of the decoding target block (S3640). The image decoding apparatus stores at least one motion vector in memory using at least one of a method of limiting the dynamic range of the motion vector, a method of reducing the spatial resolution of the motion vector, a method of quantizing the motion vector, and a method of reducing the representation resolution of the motion vector, and uses the store motion vector for motion vector prediction and motion information merge of the decoding target block.

In addition, by using motion information stored in the memory, that is, motion information of the reference picture, a decoding method such as motion vector prediction, advanced motion vector prediction, motion information merge, motion information merge skip, etc. may be performed.

In the above-described embodiment, when the motion vector of the current block is stored in the line buffer/memory, the motion vector before performing correction on the motion vector may be stored in the line buffer/memory. Here, the motion vector may be referred to as a motion vector before correction. That is, the motion vector determined from the motion vector candidate list, the merge candidate list, and the subblock unit merge candidate list may be stored before the motion compensation process of the current block. The correction may mean that the motion vector value may be changed by a predetermined rule during the motion compensation process or before the motion compensation process in the encoder/decoder.

In addition, in the above-described embodiment, when the motion vector of the current block is stored in the temporal motion vector buffer/memory, the motion vector after performing correction on the motion vector may be stored in the temporal motion vector buffer/memory. Here, the motion vector may be referred to as a motion vector after correction. That is, the motion vector corrected during the motion compensation process of the current block or before the motion compensation process of the current block may be stored.

In the case of an intra block copy mode that the current block uses a block vector so that a reconstructed region in the current image is used as a prediction block, at least one of the embodiments on motion vector may be applied to the block vector of the current block. That is, the embodiment in which the motion vector is replaced with the block vector of the above-described embodiments may be applied when the block mode is the intra-block copy mode.

In order to reduce the memory required for storing the motion information of the reference picture, motion information of a specific picture may be stored. In this case, the stored motion information of a specific picture may be used in at least one of processes of using a motion vector of a reference picture, such as generating a motion vector candidate list of a block in a current picture/slice/tile and generating a merge candidate list.

The specific picture may mean a collocated picture. That is, the motion information of the collocated picture may be used in the encoding/decoding process using motion information such as inter prediction of a picture to be subsequently encoded/decoded. Here, the specific picture may mean a specific reference picture. Here, the motion information of the reference picture may mean temporal motion information. In addition, the motion vector of the reference picture may mean a temporal motion vector. The encoding/decoding process using motion information such as the inter prediction may mean at least one of encoding/decoding processes using a temporal motion vector.

The specific picture for current picture/slice/tile may be at least one picture for each reference picture list. In addition, the specific picture for the current picture/slice/tile may be at least one picture for a plurality of reference picture lists.

In order to store the motion information of the specific picture, it is possible to perform entropy encoding/decoding on a motion information storage indicator on whether at least one motion information of picture, slice, tile, CTU, block is stored in at least one unit of a picture, slice, tile, CTU, block. The motion information storage indicator may be signaled in at least one of a picture parameter set, a slice header, a tile header, a CTU unit, and a block unit. The motion information storage indicator may be signaled using a high level syntax element.

As shown in the example of FIG. 37, it is to possible to signal a motion information storage indicator (motion_info_stored_flag) indicating that motion information is stored in a picture parameter set of the current picture, so that motion information of a current picture may be used for encoding/decoding a picture to be subsequently encoded/decoded.

For example, when the motion information storage indicator is a first value, it may mean that motion information is stored in a corresponding unit, and when it is a second value, it may mean that motion information is not stored in the corresponding unit. Here, the first value may mean 1, and the second value may mean 0. The motion information indicator may be signaled when at least one type of the current picture, slice, or tile is B, P, may not be signaled when at least one type of the current picture, slice, or tile is I, and may be inferred as the second value.

When the motion information storage indicator is the first value, the picture may be used as a collocated picture of a picture to be subsequently encoded/decoded. In addition, when the motion information storage indicator is the second value, the corresponding picture may not be used as a collocated picture of a picture to be subsequently encoded/decoded.

As shown in the example of FIG. 38, it is possible to entropy encode/decode at least one of collocated direction information (collocated_from_l0_flag) and collocated picture index (collocated_ref_idx) in a picture to be subsequently encoded/decoded in at least one of a picture parameter set, slice header, tile header, CTU unit, and block unit. Here, the collocated direction information may mean whether the collocated picture exists in an L0 reference picture list or an L1 reference picture list, and the collocated picture index may mean an index indicating the collocated picture in the reference picture list. The collocated picture index may be signaled when at least one type of the current picture, slice, or tile is B or P, may not be signaled when at least one type of the current picture, slice, or tile is I, and may be inferred as a value of 0.

In FIG. 38, slice_type may mean a type of a slice type among I, B, and P, and num_ref_idx_l0_active_minus1, and num_ref_idx_l1_active_minus1 may refer to the number of reference pictures in the L0 and L1 reference picture lists.

Herein, a collocated picture list for each of the L0 direction and the L1 direction is configured with pictures having the motion information storage indicator of a first value, and the collocated picture index may be entropy encoded/decoded to indicate a picture used as a collocated picture in the list. Herein, the collocated picture index may be entropy encoded/decoded in the picture to be subsequently encoded/decoded. Here, the list composed of pictures having the motion information storage indicator of the first value may be referred to as a collocated picture list.

Further, one collocated picture list is configured with pictures having the motion information storage indicator of a first value, a collocated picture index is entropy encoded/decoded without performing entropy encoding/decoding for collocated direction information, thereby indicating the picture used as the collocated picture in the list.

In addition, the collocated picture index may be entropy encoded/decoded when at least one picture exists in the collocated picture list.

In addition, at least one collocated picture may be determined. For example, a plurality of collocated pictures may be used in encoding/decoding of pictures to be subsequently encoded/decoded. In this case, at least one collocated picture index may be entropy encoded/decoded in one picture.

It is possible to identify pictures having the motion information storage indicator of the first value, before configuring the collocated picture list The order of the collocated pictures may be arranged in the configured collocated picture list. In this case, the pictures may be sorted in the list in increasing order of absolute values of differences between the collocated picture POC value and the current picture POC value. In addition, the pictures may be sorted in the list in decreasing order of absolute values of differences between the collocated picture POC value and the current picture POC value.

The collocated picture list may be configured with the pictures having the motion information storage indicator of the second value.

Figure 39:
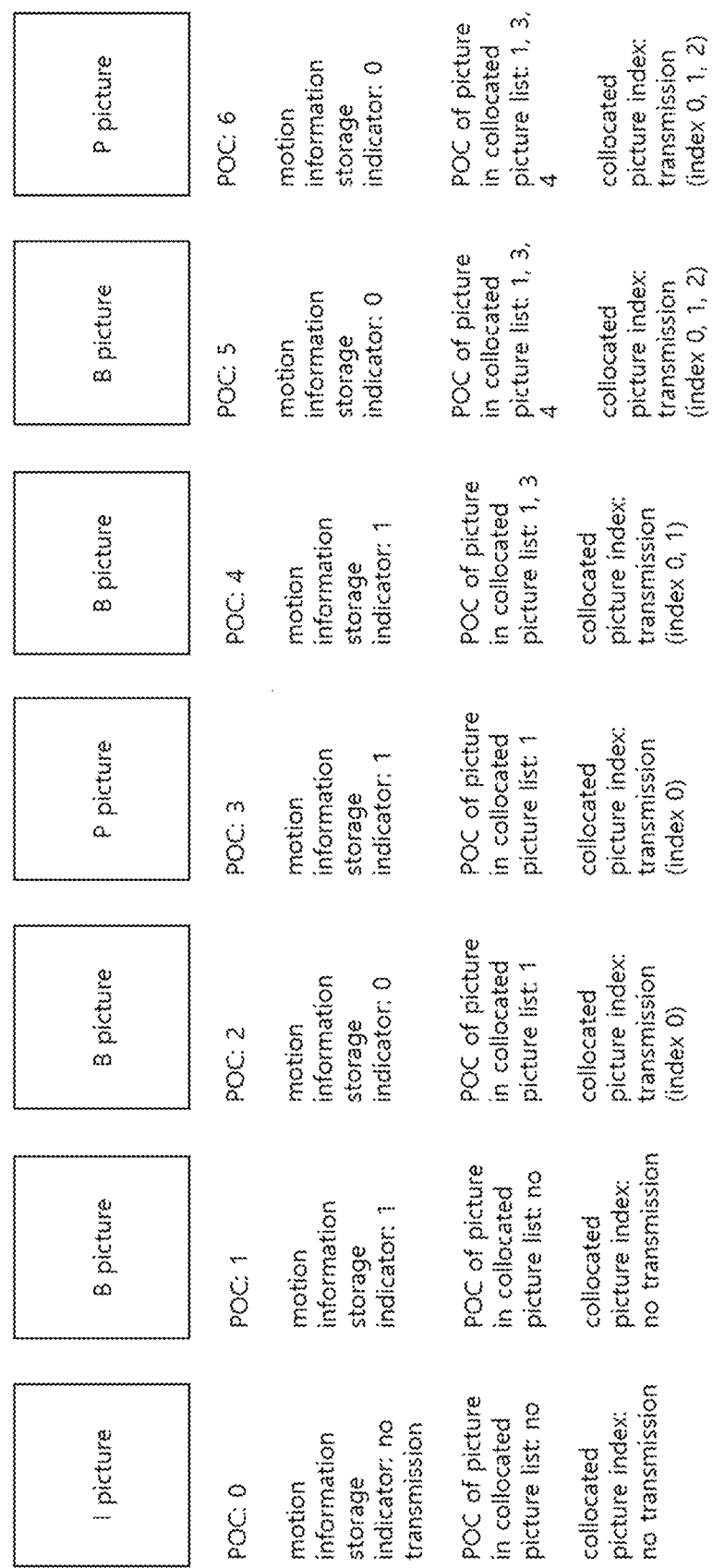
FIG. 39 is a diagram illustrating an example in which a motion information storage indicator is used.

FIG. 39 is a diagram illustrating an example in which a motion information storage indicator is used.

As in the example of FIG. 39, the motion information storage indicator may be signaled for each picture. In this case, when the motion information storage indicator indicates 1 which is the first value, motion information of the picture may be stored. The collocated picture list may be configured with pictures having the motion information stored. When at least one picture is present in the collocated picture list, the collocated picture index may be signaled. When there is a plurality of pictures in the collocated picture list, the collocated picture index for the picture selected as the collocated picture among the plurality of pictures may be entropy encoded/decoded.

FIG. 39 shows that there is one collocated picture list, but the present invention is not limited thereto, and at least one collocated picture list may be used. In addition, collocated picture lists of the same number as the number of reference picture lists may be used. In addition, when two or more collocated picture lists are used, the collocated direction information may be entropy encoded/decoded to indicate which collocated picture list is used. In this case, when three or more collocated picture lists are used, the collocated direction information may be entropy encoded/decoded in an index form instead of a flag form.

Information of the number of collocated pictures indicating the number of pictures included in the collocated picture list may be signaled from the encoder to the decoder and may be a value preset in the encoder and the decoder. For example, the number of collocated pictures may be fixed and used by N in the encoder and the decoder. Here, N may be 0 or a positive integer. In addition, when a new collocated picture is added to the collocated picture list, the collocated picture added first may be deleted from the list, and the new collocated picture may be added to the list. The collocated picture list may be managed in a first in first out (FIFO) manner. In addition, the collocated picture added first to the collocated picture list may be assigned an index having the largest value, and the collocated picture added last may be assigned an index having the smallest value. On the contrary, the collocated picture added first to the collocated picture list may be assigned an index having the smallest value, and the collocated picture added last may be assigned an index having the largest value.

Figure 40:
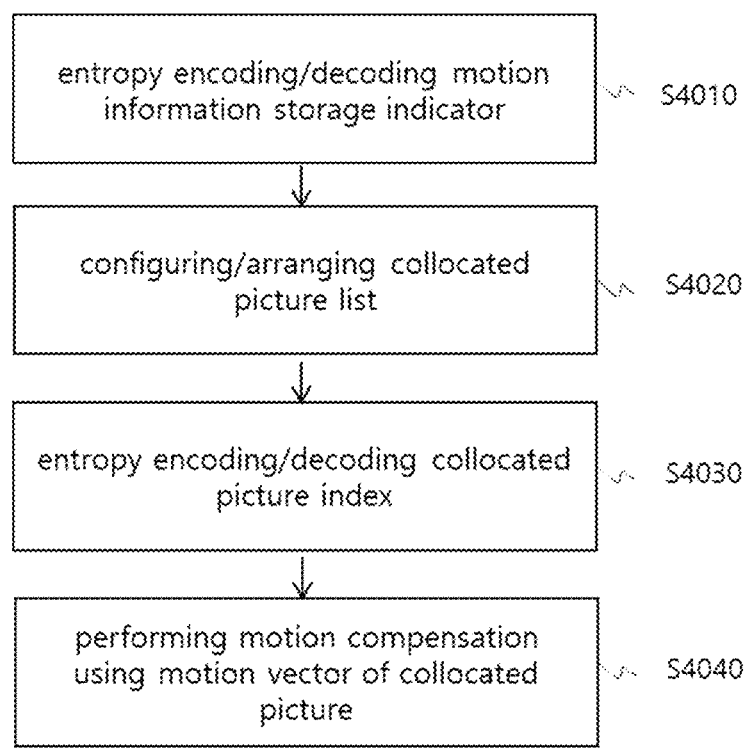
FIG. 40 is a flowchart illustrating a method of encoding/decoding an image according to an embodiment of the present invention.

FIG. 40 is a flowchart illustrating a method of encoding/decoding an image according to an embodiment of the present invention.

Referring to FIG. 40, the image encoding/decoding method includes a step of entropy encoding/decoding a motion information storage indicator (S4010), a step of configuring/arranging a collocated picture list (S4020), a step of entropy encoding/decoding a collocated picture index (S4030), and a step of performing the motion compensation using the motion vector of the collocated picture (S4040).

In the step of entropy encoding/decoding the motion information storage indicator (S4010) of FIG. 40, according to at least one of the above embodiments, the motion information storage indicator may be entropy encoded/decoded for each picture.

In the step of configuring/arranging a collocated picture list (S4020), it is possible to configure the collocated picture list according to at least one of the above embodiments and arrange the pictures in the collocated picture list if necessary.

In the step of entropy encoding/decoding the collocated picture index (S4030), it is possible entropy encode/decode the collocated picture index according to at least one of the above embodiments.

In the step of performing motion compensation using the motion vector of the collocated picture (S4040), it is possible to configure the motion vector candidate list or the merge candidate list by using the motion vector of the collocated picture according to at least one of the embodiments, or perform motion compensation on the based on motion vectors.

As in the example of FIG. 41, information on whether a specific reference picture is used in the current picture and information on whether motion information of the specific reference picture is used in the current picture may be entropy encoded/decoded together. That is, the information on whether a specific reference picture is used in the current picture and information on whether motion information of the specific reference picture is used in the current picture may be signaled as one syntax element.

Referring to FIG. 41, upon describing information related to the present invention, used_by_curr_pic_flag[j] may mean that the j-th reference picture is used in the current picture and motion information of the reference picture is used in the case of 1 of the first value, and the j-th reference picture is not used in the current picture and motion information of the reference picture is not used in the case of 0 of the second value.

Similarly, used_by_curr_pic_s0_flag[i] may mean that the i-th reference picture is used in the current picture and motion information of the reference picture is used in the case of 1 of the first vale, and the i-th reference picture is not used in the current picture and motion information of the reference picture is not used in the case of 0 of the second value.

In addition, used_by_curr_pic_s1_flag[i] may mean that the i-th reference picture is used in the current picture and motion information of the reference picture is used in the case of 1 of the first value, and the i-th reference picture is not used in the current picture and motion information of the reference picture is not used in the case of 0 of the second value.

Here, at least one process of marking, construction, and management of the reference picture may be equally applied to motion information of the reference picture.

For example, when a specific reference picture is marked as not used in the current picture, motion information of the reference picture may also be marked as not used in the current picture.

For example, when a specific reference picture is marked as used in the current picture, motion information of the reference picture may also be marked as used in the current picture.

For example, motion information of a reference picture may also be configured as a reference picture list or a collocated picture list according to a method configured when a specific reference picture is configured as a reference picture list.

For example, when the specific reference pictures are changed in order in the reference picture list, the motion information of the reference picture may also be changed in order in the reference picture list or the collocated picture list according to the changing method.

As in the example of FIG. 42, information on whether a specific reference picture is used in the current picture and information on whether motion information of the specific reference picture is used in the current picture may be separately entropy encoded/decoded. That is, information on whether a specific reference picture is used in the current picture and information on whether motion information of the specific reference picture is used in the current picture may be signaled as syntax elements different from each other.

Referring to FIG. 42, upon describing information related to the present invention, motion_used_by_curr_pic_flag [j] may mean that motion information of the j-th reference picture is used in the current picture in the case of 1 of the first value, and motion information of the j-th reference picture is not used in the current picture in the case of 0 of the second value Likewise, motion_used_by_curr_pic_s0_flag [i] may mean that motion information of the i-th reference picture is used in the current picture in the case of 1 of the first value, and motion information of the i-th reference picture is not used in the current picture in the case of 0 of the second value.

In addition, motion_used_by_curr_pic_s1_flag [i] may mean that motion information of the i-th reference picture is used in the current picture in the case of 1 of the first value, and motion information of the i-th reference picture is not used in the current picture in the case of 0 of the second value.

Here, at least one process of marking, construction, and management of the reference picture may be applied separately from motion information of the reference picture.

For example, when a specific reference picture is marked as not used in the current picture, motion information of the reference picture may be marked as used in the current picture or marked as not used in the current picture.

For example, when a specific reference picture is marked as used in the current picture, motion information of the reference picture may be marked as used in the current picture or marked as not used in the current picture.

For example, when a specific reference picture is configured with a reference picture list, motion information of the reference picture may also be configured or not be configured with a reference picture list or a collocated picture list.

In addition, when a specific reference picture is changed in order in the reference picture list, the motion information of the reference picture may be changed or may not be changed in order in the reference picture list or the collocated picture list.

When the reference picture is a short-term reference picture, motion information of the reference picture may be stored. In addition, when the reference picture is a long-term reference picture, motion information of the reference picture may not be stored.

Without signaling of the motion information storage indicator, the encoder/decoder may store motion information of a specific picture according to a value of a specific parameter. Here, when motion information of a specific picture is stored, motion information of the specific picture may be used in a picture that is subsequently encoded/decoded.

For example, when a temporal layer ID of a specific picture is smaller than M, motion information of the specific picture may be stored. Here, M may be 0 or a positive integer.

For example, when the absolute value of a difference between a picture order count (POC) of the specific picture and a POC of the current picture is less than J, motion information of the specific picture may be stored. Here, J may be 0 or a positive integer.

Without signaling the motion information storage indicator, when a specific picture is included in at least one of L0 and L1 direction reference picture lists, motion information of the specific picture may be stored.

It is possible to entropy encode/decode the motion vector accuracy information when storing the motion information in the current image according to the precision of a predetermined motion vector. The motion vector accuracy information may indicate that the motion vector is stored in at least one unit of integer pixel unit, 2 integer pixel unit, 4 integer pixel unit, ½ pixel unit, ¼ pixel unit, ⅛ pixel unit, 1/16 pixel unit, and the like. Here, it is possible to have the motion vector accuracy not only in the pixel unit but also in the N pixel unit or the 1/N pixel unit. Here, N may be a positive integer. The encoder/decoder may store motion information according to the motion vector accuracy information. The motion vector accuracy information may be entropy encoded/decoded when the motion information storage indicator is a first value. In addition, the motion vector accuracy may be entropy encoded/decoded in the form of a flag or index, and entropy encoded/decoded in the form of a flag or index for several selected units among several units predetermined in the encoder/decoder.

The encoder and the decoder in the above embodiment is such that only the pictures having the motion information storage indicator of the first value are determined as the collocated pictures, which are used in the encoding/decoding process.

In the above embodiment, when the picture to be subsequently encoded/decoded is the current picture, the current picture may be referred to as picture to be previously coded/decoded.

In the above embodiment, both the L0 motion information and the L1 motion information of the reference picture may be stored, but the present invention is not limited thereto. Only the L0 motion information may be stored or only the L1 motion information may be stored.

In the above embodiment, L0 motion information and L1 motion information of the reference picture, as well as at least 7 motion information of first L0 motion information, second L0 motion information, first L1 motion information, second L1 motion information, L2 motion information, L3 motion information may be stored. Herein, the first L0 motion information and the first L1 motion information may be basic motion information of a specific block, and the second L0 motion information, second L1 motion information, L2 motion information, and L3 motion information may be motion information additional to basic motion information of a specific block. For example, the additional motion information may be surrounding motion information of the specific block or motion information used additionally for motion compensation.

In the above-described embodiment, the collocated picture has been described in which motion information is stored in picture units, but the present invention is not limited thereto, and the motion information may be stored in at least one unit of a picture, a slice, a tile, a CTU, and a block.

Figure 43:
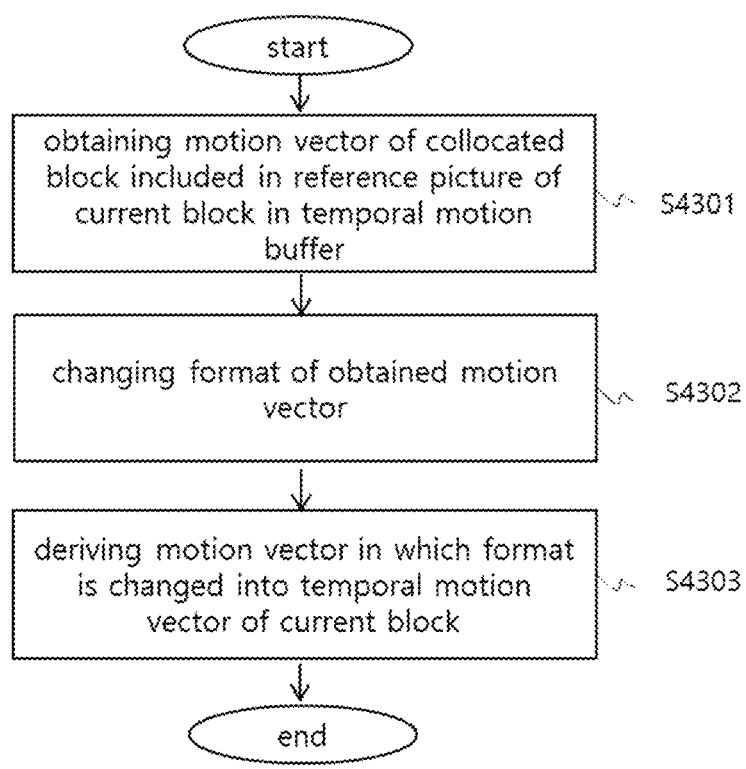
FIG. 43 is a flowchart of an image decoding method according to an embodiment of the present invention.

FIG. 43 is a flowchart illustrating an image decoding method according to an embodiment of the present invention.

Referring to FIG. 43, the image decoding apparatus may acquire a motion vector of a collocated block included in a reference picture of a current block in a temporal motion buffer (S4301).

And, the image decoding apparatus may change a format of the motion vector obtained in step S4301 (S4302).

In step S4302, the format of the obtained motion vector may be changed to a format having an increased bit depth.

In addition, in step S4302, the format of the obtained motion vector may be changed to a predetermined format. Here, the predetermined format may be a fixed bit format including a sign. For example, the predetermined format may be an 18-bit format including a sign.

Meanwhile, the format of the obtained motion vector may be a floating point format. For example, the motion vector obtained from the temporal motion buffer may be a 10-bit floating point format (or 6-bit mantissa and 4-bit odd format).

In step S4302, the image decoding apparatus may derive the motion vector in which format is changed in step S4302 into the temporal motion vector of the current block (S4303).

Meanwhile, the image decoding apparatus may further perform a step of scaling the derived temporal motion vector and a step of limiting the dynamic range of the scaled temporal motion vector after step S4303.

Here, the step of limiting the dynamic range of the scaled temporal motion vector may limit the dynamic range of the scaled temporal motion vector to a fixed bit depth. For example, the fixed bit depth may be 18 bits.

The image decoding method has been described above with reference to FIG. 43. Since the video encoding method of the present invention can be described similarly to the video decoding method described with reference to FIG. 43, redundant description is omitted.

A bitstream generated by the image encoding method of the present invention may be temporarily stored in a computer readable non-transitory recording medium, and may be decoded by the above-described image decoding method.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is equal to or greater than 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in an apparatus for encoding/decoding an image.

The invention claimed is:

1. A method of decoding an image, the method comprising:
   constructing a motion vector candidate list of a current block, the motion vector candidate list comprising a spatial motion vector candidate and a temporal motion vector candidate;
   obtaining a motion vector of the current block based on a motion vector candidate selected from the motion vector candidate list; and
   obtaining, based on the motion vector of the current block, prediction samples of the current block from a reference picture of the current block,
   wherein the spatial motion vector candidate is derived based on a motion vector of a spatial neighboring block of the current block,
   wherein the temporal motion vector candidate is derived based on a modified motion vector obtained by modifying a motion vector of a collocated block of the current block,
   wherein the modified motion vector is obtained by changing a representation format of the motion vector of the collocated block, and
   wherein changing the representation format is performed during a derivation of the temporal motion vector candidate but is not performed during a derivation of the spatial motion vector candidate.

2. The method of claim 1, wherein a bit-length of the modified motion vector is greater than the motion vector of the collocated block obtained from the temporal motion buffer.

3. The method of claim 1, wherein changing the representation formation causes the motion vector of a floating point format to be changed to the modified motion vector of a fixed bit-length format.

4. The method of claim 3, further comprising:
   scaling the modified motion vector of the collocated block; and
   clipping the scaled modified motion vector within a dynamic range of the fixed bit-length.

5. The method of claim 3, wherein the motion vector of the floating point format is consisted of 6 bits signed mantissa and 4 bits exponent, and the modified motion vector of the fixed bit-length is represented by 18 bits.

6. A method of encoding an image, the method comprising:
   constructing a motion vector candidate list of a current block, the motion vector candidate list comprising a spatial motion vector candidate and a temporal motion vector candidate; and
   obtaining a motion vector of the current block based on a motion vector candidate selected from the motion vector candidate list,
   wherein, based on the motion vector of the current block, prediction samples of the current block are obtained from a reference picture of the current block,
   wherein the spatial motion vector candidate is derived based on a motion vector of a spatial neighboring block of the current block,
   wherein the temporal motion vector candidate is derived based on a modified motion vector obtained by modifying a motion vector of a collocated block of the current block,
   wherein the modified motion vector is obtained by changing a representation format of the motion vector of the collocated block, and
   wherein changing the representation format is performed during a derivation of the temporal motion vector candidate but is not performed during a derivation of the spatial motion vector candidate.

7. A computer-readable non-transitory recording medium including a bitstream encoded by an encoding method comprising:
   constructing a motion vector candidate list of a current block, the motion vector candidate list comprising a spatial motion vector candidate and a temporal motion vector candidate; and
   obtaining a motion vector of the current block based on a motion vector candidate selected from the motion vector candidate list,
   wherein, based on the motion vector of the current block, prediction samples of the current block are obtained from a reference picture of the current block,
   wherein the spatial motion vector candidate is derived based on a motion vector of a spatial neighboring block of the current block,
   wherein the temporal motion vector candidate is derived based on a modified motion vector obtained by modifying a motion vector of a collocated block of the current block,
   wherein the modified motion vector is obtained by changing a representation format of the motion vector of the collocated block, and
   wherein changing the representation format is performed during a derivation of the temporal motion vector candidate but is not performed during a derivation of the spatial motion vector candidate.

* * * * *